(12) United States Patent
Kumar et al.

(10) Patent No.: US 9,527,741 B2
(45) Date of Patent: Dec. 27, 2016

(54) COMPOSITIONS COMPRISING ENHANCED GRAPHENE OXIDE STRUCTURES AND RELATED METHODS

(71) Applicant: Massachusetts Institute of Technology, Cambridge, MA (US)

(72) Inventors: Priyank Vijaya Kumar, Cambridge, MA (US); Neelkanth M. Bardhan, Cambridge, MA (US); Angela Belcher, Lexington, MA (US); Jeffrey Grossman, Brookline, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 2 days.

(21) Appl. No.: 14/270,276

(22) Filed: May 5, 2014

(65) Prior Publication Data
US 2014/0329002 A1 Nov. 6, 2014

Related U.S. Application Data

(60) Provisional application No. 61/819,167, filed on May 3, 2013.

(51) Int. Cl.
C01B 31/04 (2006.01)
H01B 1/04 (2006.01)

(52) U.S. Cl.
CPC .................................. *C01B 31/043* (2013.01)

(58) Field of Classification Search
CPC .................................................. C01B 31/043
USPC .......................................... 427/58; 423/415.1
See application file for complete search history.

(56) References Cited

PUBLICATIONS

International Search Report and Written Opinion dated Sep. 9, 2014 for PCT/US2014/036862.
Bagri et al., Structural evolution during the reduction of chemically derived graphene oxide. Nature Chemistry. 2010 [retrieved on Aug. 21, 2014]; 2:581-587. Retrieved from the Internet: <URL: http://nanotubes.rutgers.edu/PDFs/NatChem2010_Ceci_Model.pdf>.
Chien et al., Tunable photoluminescence from graphene oxide. Angewandte Chemie International Edition. 2012 [retrieved on Aug. 20, 2014]; 51(27):6662-6666. Retrieved from the Internet: <URL: http://nanotubes.rutgers.edu/PDFs/Ange2012_Chien.pdf>.
Jung et al., Tunable electrical conductivity of individual graphene oxide sheets reduced at "low" temperatures. Nano Letters. 2008; 8(12):4283-4287.
International Preliminary Report on Patentability for Application No. PCT/US2014/036862 mailed Nov. 12, 2015.
Eda et al., Large-area ultrathin films of reduced graphene oxide as a transparent and flexible electronic material. Nat Nanotechnol. May 2008;3(5):270-4. doi: 10.1038/nnano.2008.83. Epub Apr. 6, 2008.
Eda et al., Blue Photoluminescence from Chemically Derived Graphene Oxide. Adv Mater. Jan. 26, 2010;22(4):505-9. doi: 10.1002/adma.200901996.
Eda et al., Chemically derived graphene oxide: Towards large-area thin-film electronics and optoelectronics. Adv Mater. Jun. 11, 2010;22(22):2392-415. doi: 10.1002/adma.200903689.

(Continued)

*Primary Examiner* — Daniel C McCracken
(74) *Attorney, Agent, or Firm* — Wolf, Greenfield & Sacks, P.C.

(57) ABSTRACT

Embodiments described herein generally relate to compositions comprising a graphene oxide species. In some embodiments, the compositions advantageously have relatively high oxygen content, even after annealing.

23 Claims, 25 Drawing Sheets

(56) References Cited

PUBLICATIONS

Fan et al., Deoxygenation of Exfoliated Graphite Oxide under Alkaline Conditions: A Green Route to Graphene Preparation. Advanced Materials. 2008. 20: 4490-3. DOI: 10.1002/adma.200801306.

Feng et al., A low-temperature method to produce highly reduced graphene oxide. Nature Communications. Feb. 26, 2013. 4:1539. doi:10.1038/ncomms2555.

Gao et al., New Insights into the Structure and Reduction of Graphite Oxide. Nat. Chem. 2009. 1: 403-8. doi:10.1038/nchem.281.

Hossain et al., Chemically homogeneous and thermally reversible oxidation of epitaxial graphene. Nat Chem. Feb. 19, 2012;4(4):305-9. doi: 10.1038/nchem.1269.

Huang et al., Overcoming the Phase Inhomogeneity in Chemically Functionalized Graphene: The Case of Graphene Oxides. Phys. Rev. Lett. 2013. 110: 085501.

Hummers et al., Preparation of Graphitic Oxide. Journal of the American Chemical Society 1958. 80:1339. doi:10.1021/ja01539a017.

Hunt et al, Epoxide Speciation and Functional Group Distribution in Graphene Oxide Paper-Like Materials. Adv. Funct. Mater. 2012. 22: 3950-7. DOI: 10.1002/adfm.201200529.

Johns et al., Atomic Covalent Functionalization of Graphene. Accounts of Chemical Research 2013, 46, 77-86.

Kamat, Graphene-Based Nanoarchitectures. Anchoring Semiconductor and Metal Nanoparticles on a Two-Dimensional Carbon Support. J. Phys. Chem. Lett. 2010. 1: 520-7. DOI: 10.1021/jz900265j.

Kamat, Graphene-Based Nanoassemblies for Energy Conversion. J. Phys. Chem. Lett. 2011. 2:242-51.

Kim et al., Room-temperature Metastability of Multilayer Graphene Oxide Films. Nat. Mater. 2012. 11: 544-9. doi:10.1038/nmat3316.

Kresse et al., Efficient Iterative Schemes for Ab Initio Total-Energy Calculations Using a Plane-Wave Basis Set. Phys. Rev. B. Oct. 15, 1996. 54(16): 11169-86.

Kresse et al., From Ultrasoft Pseudopotentials to the Projector Augmented-Wave Method. Phys. Rev. B. Jan. 15, 1999. 59: 1758-1775.

Kresse, Efficiency of Ab-Initio Total Energy Calculations for Metals and Semiconductors Using a Plane-Wave Basis Set. Comput. Mater. Sci. 1996. 6: 15-50.

Kumar et al., The Impact of Functionalization on the Stability, Work Function, and Photoluminescence of Reduced Graphene Oxide. ACS Nano 2013. 7(2): 1638-45. DOI: 10.1021/nn305507p.

Liao et al., Aqueous Only Route toward Graphene from Graphite Oxide. ACS Nano. Feb. 22, 2011;5(2):1253-8. doi: 10.1021/nn1028967. Epub Jan. 27, 2011.

Lin et al., Dramatically Enhanced Photoresponse of Reduced Graphene Oxide with Linker-Free Anchored CdSe Nanoparticles. ACS Nano 2010. 4: 3033-38.

Loh et al., Graphene oxide as a chemically tunable platform for optical applications. Nat Chem. Dec. 2010;2(12):1015-24. doi:10.1038/nchem.907. Epub Nov. 23, 2010.

Lu et al., Structure of Graphene Oxide: Thermodynamics versus Kinetics. The Journal of Physical Chemistry C. 2011.115: 11991-5. DOI: 10.1021/jp204476q.

Mattson et al., Evidence of Nanocrystalline Semiconducting Graphene Monoxide during Thermal Reduction of Graphene Oxide in Vacuum. ACS Nano 2011. 5: 9710-7. DOI: 10.1021/nn203160n.

Nguyen et al., Two-dimensional nucleation and growth mechanism explaining graphene oxide structures. Phys. Rev. B. 2012. 86: 115406.

Paci et al., Computational Studies of the Structure, Behavior upon Heating, and Mechanical Properties of Graphite Oxide. J. Phys. Chem. C. 2007. 111: 18099-111.

Perdew et al., Generalized Gradient Approximation Made Simple. Phys. Rev. Lett. Oct. 28, 1996. 77(18): 3865-8. DOI: 10.1103/PhysRevLett.78.1396.

Potts et al., Graphene-Based Polymer Nanocomposites. Polymer. 2011. 52:5-25. doi:10.1016/j.polymer.2010.11.042.

Pyun, Graphene Oxide as Catalyst: Application of Carbon Materials Beyond Nanotechnology. Angew. Chem. Int. Ed. 2011. 50(1): 46-8. DOI: 10.1002/anie.201003897.

Ramanathan et al., Functionalized Graphene Sheets for Polymer Nanocomposites. Nat. Nanotechnol. 2008. 3: 327-31. doi:10.1038/nnano.2008.96.

Rourke et al., The Real Graphene Oxide Revealed: Stripping the Oxidative Debris from the Graphene-like Sheets. Angewandte Chemie International Edition. Mar. 28, 2011;50(14):3173-7. doi:10.1002/anie.201007520. Epub Feb. 25, 2011.

Solenov et al., Adsorbate Transport on Graphene by Electromigration. Phys. Rev. Lett. Jan. 2012. 109:095504. DOI: 10.1103/PhysRevLett.109.095504.

Su et al., Probing the catalytic activity of porous graphene oxide and the origin of this behaviour. Nature Communications. Dec. 18, 2012. 5: 8 pages. doi:10.1038/ncomms2315.

Suarez et al., Gate-Voltage Control of Oxygen Diffusion on Graphene. Phys. Rev. Lett. Apr. 8, 2011;106(14):146802. Epub Apr. 5, 2011.

Szabo et al., Evolution of Surface Functional Groups in a Series of Progressively Oxidized Graphite Oxides. Chem. Mater. 2006. 18: 2740-9.

Topsakal et al., Domain formation on oxidized graphene. Phys. Rev. B. 2012: 86: 205402. DOI: 10.1103/PhysRevB.86.205402.

Van Duin et al., ReaxFF: A Reactive Force Field for Hydrocarbons. J. Phys. Chem. A. 2001. 105(41): 9396-9409. DOI: 10.1021/jp004368u.

Wang et al., Stability of Graphene Oxide Phases from First-Principles Calculations. Phys. Rev. B. Oct. 2010. 82: 161406. DOI: 10.1103/PhysRevB.82.161406.

Wei et al., Nanoscale Tunable Reduction of Graphene Oxide for Graphene Electronics. Science. Jun. 11, 2010. 328: 1373-6. DOI: 10.1126/science.1188119.

Xu et al., What Is the Choice for Supercapacitors: Graphene or Graphene Oxide? Energy Environ. Sci. 2011. 4: 2826-30. DOI: 10.1039/C1EE01198G.

Yun et al., Solution-Processable Reduced Graphene Oxide as a Novel Alternative to PEDOT:PSS Hole Transport Layers for Highly Efficient and Stable Polymer Solar Cells. Adv. Mater. 2011. 23(42): 4923-8. DOI: 10.1002/adma.201102207.

Zhu et al., Nanostructured Reduced Graphene Oxide/$Fe_2O_3$Composite As a High-Performance Anode Material for Lithium Ion Batteries. ACS Nano 2011. 5: 3333-8. doi: 10.1021/nn200493r. Epub Mar. 31, 2011.

COMPOSITIONS COMPRISING ENHANCED GRAPHENE OXIDE STRUCTURES AND RELATED METHODS

RELATED APPLICATIONS

This application claims priority under 35 U.S.C. §119(e) to U.S. Provisional Application Ser. No. 61/819,167, filed May 3, 2013, and entitled "Scalable Method for Increasing Visible Absorption and Electrical Conductivity of As-Synthesized Graphene Oxide Sheets for Optoelectronics, Photonics, and Energy Conversion and Storage Technologies," the contents of which are incorporated herein by reference in its entirety for all purposes.

GOVERNMENT SPONSORSHIP

This invention was made with Government support under Grant No. W911NF-09-D-0001 awarded by the Army Research Office and under Grant No. DE-AR0000180 awarded by the Department of Energy. The Government has certain rights in the invention.

FIELD

Embodiments described herein generally relate to compositions comprising enhanced graphene oxide structures and related methods.

BACKGROUND

Graphene oxide (GO) is a versatile, solution-processable candidate for next-generation, large area, ultra-thin electronics, optoelectronics, energy conversion and storage technologies. The ability to tune and spatially control the oxygen functionality in GO structures may be useful in in opening up band gaps comparable to those of silicon (~1 eV) for applications in digital electronics and photonics. Such control may also be desirable in technologies based on green and sustainable catalysts, metal/semiconductor GO composites, and/or chemical/biological sensors, which utilize the rich and interactive oxygen framework in a number of ways. However, use of GO in these devices has been limited by the material's inherent chemical inhomogeneity and structural disorder due to, for example, harsh environments, and the inability to exercise spatial control over oxygen groups under present synthetic protocols. These processing limitations result in large optical gaps (~5.6 eV) and poor electronic conductivity, affecting device performance unfavorably. Given the high impact of controlled oxygen functionalization on an increasing number of applications utilizing GO, developing methods that preserve the oxygen functionality and yet enable enhancement of the optical and electronic properties would be desirable in certain applications.

One approach often used to produce GO structures on a large scale is the Hummers' method, which typically renders an oxygen concentration of ~30-35 at %. To date, many methods to improve the sheet characteristics of as-synthesized GO structures have been reported, but many of these improvements have come at the expense of oxygen content. One such procedure is to produce reduced GO (rGO) with ~8 at % oxygen. Alternatively, several groups have attempted careful hydrothermal treatments under alkaline or acidic conditions, achieving partial success in conserving oxygen functionality (~15-20 at %) with improved sheet properties. Other approaches include controlled chemical functionalization methods such as dissociating oxygen molecules in ultra-high vacuum to achieve selective epoxy functionalization, the use of local reduction methods with nanometer resolution and thermal annealing at 750° C. in vacuum to produce graphene monoxide. However, these techniques generally employ expensive ultra-high vacuum set-ups and high temperature systems, making them less amenable to large-scale processing of GO sheets.

SUMMARY

Compositions comprising enhanced graphene oxide structures and related methods are disclosed. The subject matter of the present invention involves, in some cases, interrelated products, alternative solutions to a particular problem, and/or a plurality of different uses of one or more systems and/or articles.

In some embodiments, methods involving carbon nanostructures (e.g., graphene oxide species) are provided. The method may comprise heating a first composition comprising a first graphene oxide species at a temperature of about 150° C. or less in the absence of a chemical reagent capable of reacting with the first graphene oxide species, thereby producing a second composition comprising a second graphene oxide species different from the first graphene oxide species. In some embodiments, the first graphene oxide species comprises oxygen-containing groups attached to the first graphene oxide species and dispersed over a surface of the first graphene oxide species. In some embodiments, the heating step causes at least some of the oxygen-containing groups to rearrange and/or migrate to a different location on the surface of the graphene oxide. In some embodiments, the atomic % of oxygen in the second graphene oxide species is at least 50% of the atomic % of oxygen in the first graphene oxide species. In some embodiments, the second composition comprises: a first set of domains comprising carbon atoms substituted with oxygen-containing groups; and a second set of domains comprising carbon atoms that are substantially free of oxygen-containing groups. In some embodiments, the atomic % of oxygen in the first set of domains is about 40% or greater.

In another set of embodiments, the method comprises heating a first composition comprising a first graphene oxide species, thereby producing a second composition comprising a second graphene oxide species, wherein the atomic % of oxygen in the second graphene oxide species is at least about 50% of the atomic % of oxygen in the first graphene oxide species. In some embodiments, the first graphene oxide species comprises oxygen-containing groups attached to the first graphene oxide species and dispersed over a surface of the first graphene oxide species. In some embodiments, the heating step causes at least some of the oxygen-containing groups to rearrange and/or migrate to a different location on the surface of the graphene oxide. In some embodiments, the heating step is performed at a temperature of about 150° C. or less. In some embodiments, the heating step is performed in the absence of a chemical reagent capable of reacting with the first graphene oxide species. In some embodiments, the second composition comprises: a first set of domains comprising carbon atoms substituted with oxygen-containing groups; and a second set of domains comprising carbon atoms that are substantially free of oxygen-containing groups.

In another set of embodiments, the method comprises heating a first composition comprising first graphene oxide species comprising oxygen-containing groups attached to the first graphene oxide species and dispersed over a surface of the first graphene oxide species, thereby producing a second composition comprising a second graphene oxide species, the second graphene oxide species comprising: a first set of domains comprising carbon atoms substituted with the oxygen-containing groups; and a second set of domains comprising carbon atoms that are substantially free of oxygen-containing groups. In some embodiments, the heating step is performed at a temperature of about 150° C. or less. In some embodiments, the heating step is performed in the absence of a chemical reagent capable of reacting with the first graphene oxide species. In some embodiments, the atomic % of oxygen in the second graphene oxide species is at least 50% of the atomic % of oxygen in the first graphene oxide species.

In any of the foregoing embodiments, the heating step is performed in the absence of a chemical reagent. The chemical reagent may be a reducing agent, such as hydrazine, dimethylhydrazine, hydroquinone, $NaBH_4$, and/or N,N-dimethylacetamide. The chemical reagent may also be a strong base, such as sodium hydroxide and/or potassium hydroxide.

In any of the foregoing embodiments, the heating step may be performed at a temperature of about 150° C. or less, about 125° C. or less, about 100° C. or less, about 90° C. or less, about 80° C. or less, about 70° C. or less, about 60° C. or less, or about 50° C. or less.

In any of the foregoing embodiments, the heating step may be performed for a period of at least about 5 days, at least about 7 days, at least about 9 days, at least about 15 days, or at least about 20 days.

In any of the foregoing embodiments, the heating step may be performed at atmospheric pressure. In any of the foregoing embodiments, the heating step may be performed at a pH of about 7.

In any of the foregoing embodiments, the first and second compositions may be in substantially solid form, such as a thin film and/or a powder. In any of the foregoing embodiments, the first and second compositions further may comprise a fluid carrier and/or may be in the form of a suspension, emulsion, or solution. In some cases, the fluid carrier is a non-aqueous solution. In some cases, the fluid carrier is an aqueous solution (e.g., water).

In any of the foregoing embodiments, the atomic % of oxygen in the second graphene oxide species may be at least about 60%, at least about 70%, at least about 80%, or at least about 90% of the atomic % of oxygen in the first graphene oxide species.

In any of the foregoing embodiments, the atomic % of oxygen in the second graphene oxide species may be greater than about 20 at %, about 25 at %, about 30 at %, or about 35 at %.

In any of the foregoing embodiments, the oxygen-containing groups may comprise epoxy groups, carboxyl groups, carbonyl groups, lactol groups, and/or hydroxyl groups.

In any of the foregoing embodiments, the atomic % of oxygen in the first set of domains is at least about 40 at %, about 45 at %, or about 50 at %.

In any of the foregoing embodiments, the second graphene oxide species may absorbs at least about 20%, about 25%, about 30%, about 35%, or about 40% more photons in the visible range than the first graphene oxide species, when placed under essentially identical conditions.

In any of the foregoing embodiments, the second graphene oxide species may exhibit a sheet resistance of about $1\times10^9$ ohms/sq or less, about $1\times10^8$ ohms/sq or less, about $1\times10^7$ ohms/sq or less, about $1\times10^6$ ohms/sq or less, or about $1\times10^5$ ohms/sq or less.

In any of the foregoing embodiments, the first graphene oxide species may exhibit a first peak emission wavelength and the second graphene oxide species may exhibit a second peak emission wavelength, wherein the second peak emission wavelength is at least about 50 nm less, about 100 nm less, about 150 nm less, about 200 nm less, about 250 nm less, about 300 nm less, about 350 nm less, about 400 nm less, about 450 nm less, or about 500 nm less than the first peak emission wavelength.

In any of the foregoing embodiments, the second graphene oxide species has a band gap of about 5 eV or less, about 2.5 eV or less, about 2 eV or less, about 1 eV or less, or about 0.5 eV or less.

In any of the foregoing embodiments, the second graphene oxide species may arranged in contact with one or more electrodes. In any of the foregoing embodiments, the second graphene oxide species may be arranged in a device.

In any of the foregoing embodiments, the method may further comprise treating graphene to produce the first graphene oxide species. For example, graphene may be treated with an oxidant to produce graphene oxide.

Compositions comprising carbon nanostructures (e.g., graphene oxide species) are also provided. In some embodiments, the composition comprises a graphene oxide species prepared using a method as in any of the foregoing embodiments. In some embodiments, the composition comprises a graphene oxide species comprising a first set of domains comprising carbon atoms substituted with oxygen-containing groups and a second set of domains comprising carbon atoms that are substantially free of oxygen-containing groups, wherein the composition may exhibit a sheet resistance of about $1\times10^9$ ohms/sq or less. In some embodiments, the composition may exhibit a peak emission wavelength of about 500 nm or less. In some embodiments, the atomic % of oxygen of the graphene oxide species is greater than about 20 at %.

In another set of embodiments, the composition comprises a graphene oxide species comprising a first set of domains comprising carbon atoms substituted with oxygen-containing groups and a second set of domains comprising carbon atoms that are substantially free of oxygen-containing groups, wherein the composition may exhibit a peak emission wavelength of about 500 nm or less. In some embodiments, the composition may exhibit a sheet resistance of about $1\times10^9$ ohms/sq or less. In some embodiments, the atomic % of oxygen of the graphene oxide species is greater than about 20 at %.

In another set of embodiments, the composition comprises a graphene oxide species having a weight % of oxygen atoms that is greater than about 20 wt %, wherein the composition may exhibit a sheet resistance of about $1\times10^9$ ohms/sq or less. In some embodiments, the composition may exhibit a peak emission wavelength of about 500 nm or less.

In another set of embodiments, the composition comprises a graphene oxide species having an atomic % of oxygen that is greater than about 20 at %, wherein the composition may exhibit a peak emission wavelength of about 500 nm or less. In some embodiments, the composition may exhibit a sheet resistance of about $1\times10^9$ ohms/sq or less.

In any of the foregoing embodiments, the graphene oxide species may comprise a first set of domains comprising carbon atoms substituted with oxygen-containing groups; and a second set of domains comprising carbon atoms that are substantially free of oxygen-containing groups. In some cases, the oxygen-containing groups comprise epoxy groups, carboxyl groups, carbonyl groups, lactol groups, and/or hydroxyl groups.

In any of the foregoing embodiments, the atomic % of oxygen in the first set of domains may be at least about 40 at %, about 45 at %, or about 50 at %.

In any of the foregoing embodiments, the atomic % of oxygen in the second graphene oxide species may be greater than about 25 at %, about 30 at %, about 35 at %, or about 40 at %.

In any of the foregoing embodiments, the second graphene oxide species may exhibit a sheet resistance of about $1\times10^8$ ohms/sq or less, about $1\times10^7$ ohms/sq or less, about $1\times10^6$ ohms/sq or less, or about $1\times10^5$ ohms/sq or less.

In any of the foregoing embodiments, the second graphene oxide species may exhibit a band gap of about 5 eV or less, about 2.5 eV or less, about 2 eV or less, about 1 eV or less, or about 0.5 eV or less.

In any of the foregoing embodiments, the first and/or second compositions may be in substantially solid form, including in the form of a thin film and/or a powder.

In any of the foregoing embodiments, the first and/or second compositions may further comprise a fluid carrier. The fluid carrier may be an aqueous solution, a non-aqueous solution, or a mixture thereof. In some cases, the fluid carrier is water. In some cases, the first and/or second compositions are in the form of a suspension, emulsion, or solution.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

Figure 1A:
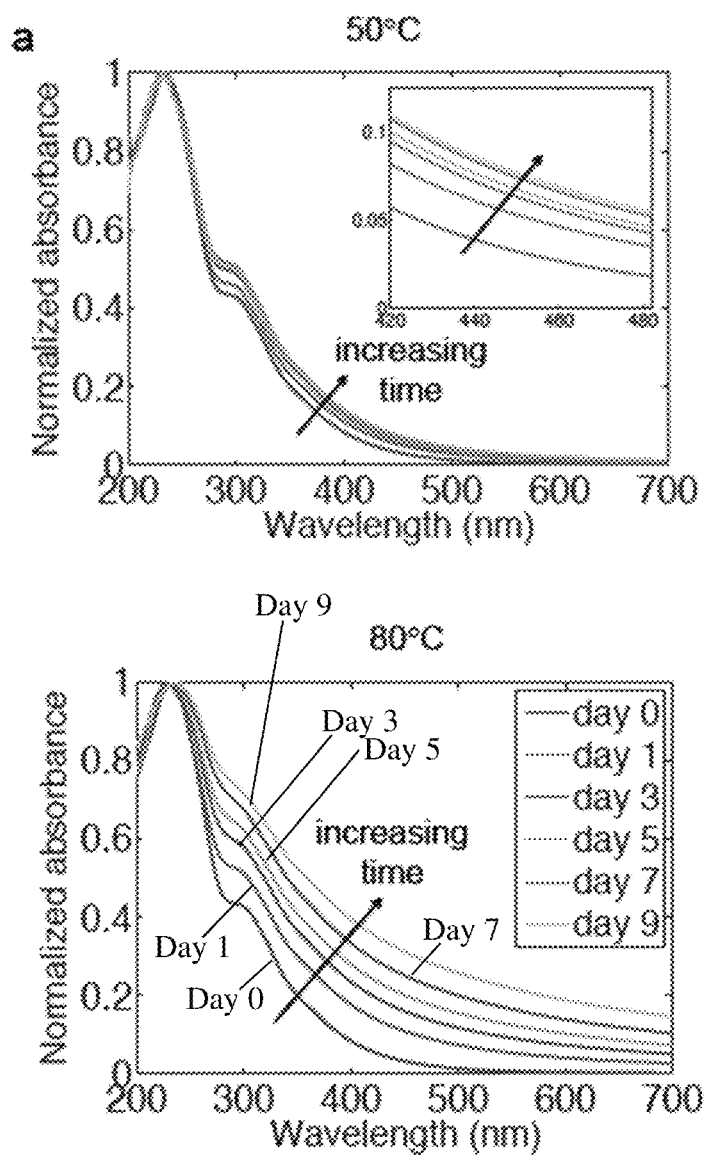
FIG. 1 shows (a) normalized UV-Vis absorption spectra for suspensions comprising a graphene oxide species, according to some embodiments; (b) normalized UV-Vis absorption spectra for solid compositions comprising a graphene oxide species, according to some embodiments; (c) photographs of suspensions comprising graphene oxide species, according to some embodiments; and (d) a plot of sheet resistance as a function of time for thin films comprising graphene oxide species, according to some embodiments.

Other aspects, embodiments and features of the invention will become apparent from the following detailed description when considered in conjunction with the accompanying drawings. The accompanying figures are schematic and are not intended to be drawn to scale. For purposes of clarity, not every component is labeled in every figure, nor is every component of each embodiment of the invention shown where illustration is not necessary to allow those of ordinary skill in the art to understand the invention. All patent applications and patents incorporated herein by reference are incorporated by reference in their entirety. In case of conflict, the present specification, including definitions, will control.

DETAILED DESCRIPTION

Embodiments described herein generally relate to compositions comprising a carbon-nanostructure, such as a graphene oxide species. In some embodiments, the carbon nanostructure may be treated to undergo a rearrangement of atoms, resulting in improved electronic and optical properties. Such rearrangement of atoms may, in some cases, be performed under relatively mild conditions.

Compositions comprising carbon nanostructure are provided. Some embodiments are directed to compositions comprising a carbon-based nanostructure (e.g., a carbon-containing structure comprising a fused network of rings, such as aromatic rings). Examples of carbon-based nanostructures include, but are not limited to, graphene, carbon nanotubes (e.g., single-walled carbon nanotubes, multi-walled carbon nanotubes), fullerenes, and the like. In some embodiments, the carbon-based nanostructure comprises a graphene oxide species. Graphene oxide species generally refer to graphene that has been functionalized with one or more oxygen-containing groups, including epoxide groups, hydroxyl groups, carbonyl groups, and the like. In some cases, the graphene oxide species disclosed herein may include an advantageous arrangement of oxygen-containing groups on at least one surface (e.g., basal plane) of the graphene oxide. For example, typical graphene oxide species (e.g., graphene which has been treated with an oxidant or other oxidizing species) may include a plurality of oxygen-containing groups attached to the graphene oxide and dispersed over the surface and/or edges of the graphene oxide. By contrast, some embodiments disclosed herein provide graphene oxide species having various portions (e.g., domains) which include oxygen-containing groups and other portions (e.g., domains) which are substantially free of such oxygen-containing groups. Such an arrangement of portions can provide enhanced electrical and/or optical properties, as described more fully below.

In some cases, the carbon nanostructure may be a graphene oxide species comprising a first set of domains (e.g., oxidized domains) comprising carbon atoms substituted with oxygen-containing groups and a second set of domains (e.g., graphitic domains) comprising carbon atoms that are not substituted with oxygen-containing groups. These compositions (e.g., phase-separated graphene oxide compositions) may exhibit, for example, low electrical resistance (e.g., high electrical conductivity) when compared to typical graphene oxide species having oxygen-containing groups substantially evenly dispersed over the basal plane of the graphene oxide. In certain cases, the phase-separated graphene oxide species can absorb photons in the visible range, and/or may have a relatively small band gap. Such graphene oxide species may advantageously have relatively high oxygen content, which may allow the optical and/or electrical properties of the compositions to be easily modulated according to the needs of various optoelectronic applications.

In some embodiments, compositions comprising the graphene oxide species disclosed herein (e.g., phase-separated graphene oxide species) are provided in substantially solid form. In certain cases, the composition is in the form of a powder. In some cases, the composition is in the form of a thin film. In some cases, the solid composition may have been freeze dried (e.g., by immersing a suspension of graphene oxide in liquid nitrogen).

In some embodiments, compositions comprising the graphene oxide species disclosed herein (e.g., phase-separated graphene oxide species) further comprise a fluid carrier, forming a suspension, emulsion, solution, or the like. In some cases, the fluid carrier may be an aqueous solution. In some cases, the fluid carrier may be a non-aqueous solution. In some embodiments, the fluid carrier is water. Other examples of suitable fluid carriers include, but are not limited to, benzene, p-cresol, toluene, xylene, mesitylene, diethyl ether, glycol, petroleum ether, hexane, cyclohexane, pentane, dichloromethane (or methylene chloride), chloroform, carbon tetrachloride, dioxane, tetrahydrofuran (THF), dimethyl sulfoxide, dimethylformamide, hexamethyl-phosphoric triamide, ethyl acetate, pyridine, triethylamine, picoline, mixtures thereof, or the like.

In some embodiments, a suspension is formed by exfoliation (e.g., ultrasonic exfoliation) of graphene oxide sheets in the fluid carrier. The suspension may have any appropriate solids content. The amount of graphene oxide (e.g., solid graphene oxide) in the suspension may be expressed as weight percent (wt %). Weight percent generally refers to ratio of the weight of a certain component (e.g., solids, graphene oxide, carbon, oxygen) of a composition to the total weight of the composition, multiplied by 100 to obtain a percentage. In some embodiments, the suspension has a graphene oxide content of about 0.25 wt % or less, about 0.5 wt % or less, about 1 wt % or less, about 2 wt % or less, about 5 wt % or less, or about 10 wt % or less. In some embodiments, the suspension has a graphene oxide content in the range of about 0.25 wt % to about 1 wt %, about 0.25 wt % to about 2 wt %, about 0.25 wt % to about 5 wt %, about 0.25 wt % to about 10 wt %, about 0.5 wt % to about 1 wt %, about 0.5 wt % to about 2 wt %, about 0.5 wt % to about 5 wt %, about 0.5 wt % to about 10 wt %, about 1 wt % to about 2 wt %, about 1 wt % to about 5 wt %, or about 1 wt % to about 10 wt %.

Those of ordinary skill in the art would be able to select the appropriate composition for use in a particular application. Methods known in the art may be used to provide the composition as a powder or as a thin film (e.g., casting from a mixture of the graphene oxide with a fluid carrier).

Methods for producing such compositions are also provided. In some cases, the method may involve treating a first graphene oxide species under mild conditions to produce a second, different graphene oxide species. For example, the first graphene oxide species may include oxygen-containing groups that are attached to and dispersed across the surface of the graphene oxide. Treatment of the first graphene oxide species may produce a second graphene oxide species having domains which include carbon atoms substituted with oxygen-containing groups and other domains which include carbon atoms that are not substituted with oxygen-containing groups. That is, the resulting graphene oxide species may be phase-separated, with respect to the arrangement of oxygen-containing groups on the graphene oxide.

In some cases, a domain of a graphene oxide species can refer to a portion of the surface of the graphene oxide species that has a largest characteristic dimension of at least about 1 nm, at least 2 nm, at least 3 nm, at least 5 nm, or in some cases, at least 10 nm, as determined by Raman spectroscopy. A domain does not refer, for example, to a single unsubstituted carbon atom, or a single carbon atom substituted with a single oxygen-containing group.

Some methods described herein can advantageously be performed under relatively mild conditions. For example, in some embodiments, the method is performed at a relatively low temperature, obviating the need for expensive high-temperature systems. In some embodiments, the method is performed at atmospheric pressure, avoiding the need for expensive high-pressure or low-pressure (e.g., ultra-high vacuum) systems. These methods may therefore be low cost and/or easily scalable. In some embodiments, the methods described herein are advantageously performed in the absence of chemical reagents that are capable of reacting with the graphene oxide. These non-chemical methods may avoid the use of harsh and/or hazardous conditions and, further, may allow the optical and/or electrical properties of the graphene oxide compositions to be enhanced while substantially preserving the oxygen content of the compositions.

In some graphene oxide species/compositions treated using method disclosed herein, the graphene oxide species includes a first set of domains (e.g., oxidized domains) comprising carbon atoms substituted with oxygen-containing groups (e.g., hydroxyl groups, epoxy groups), where the oxidized domains may contain relatively high oxygen content. Oxygen content of a graphene oxide species may be indicated as atomic percent (at %) of oxygen. Atomic percent generally refers to the ratio of the number of a particular kind of atom (e.g., oxygen) to the total number of atoms (e.g., in a graphene oxide species), multiplied by 100 to obtain a percentage. In some embodiments, the atomic percent of oxygen in the first set of domains is at least about 20 at %, at least about 25 at %, at least about 30 at %, at least about 35 at %, at least about 40 at %, at least about 45 at %, or at least about 50 at %. In some embodiments, the atomic percent of oxygen in the first set of domains is in the range of about 20 at % to about 40 at %, about 20 at % to about 45 at %, about 20 at % to about 50 at %, about 30 at % to about 50 at %, about 35 at % to about 50 at %, or about 40 at % to about 50 at %. Due to the presence of oxygen-containing functional groups bonded to carbon atoms in the first set of domains, the first set of domains may comprise a mixture of $sp^2$ and $sp^3$ hybridized carbon atoms.

The second set of domains (e.g., graphitic domains) may comprise carbon atoms. In some embodiments, the atomic percent of oxygen in the second set of domains is less than about 10 at %, less than about 5 at %, less than about 1 at %, less than about 0.5 at %, or about 0%. In some cases, the atomic percent of oxygen in the second set of domains is in the range of about 0 at % to about 0.5 at %, about 0 at % to about 1 at %, about 0 at % to about 5 at %, about 0 at % to about 10 at %, about 1 at % to about 5 at %, about 1 at % to about 10 at %, or about 5 at % to about 10 at %. In some embodiments, the second set of domains is substantially free of oxygen-containing groups. In some embodiments, the second set of domains consists essentially of carbon atoms. In the absence of oxygen-substituted carbon atoms, the second set of domains may substantially comprise $sp^2$ carbon atoms. In some embodiments, the percentage of carbon atoms in the second set of domains that are $sp^2$ carbon atoms is at least about 50%, at least about 60%, at least about 70%, at least about 80%, at least about 90%, at least about 95%, at least about 99%, or about 100%. In some embodiments, the percentage of carbon atoms in the second set of domains that are $sp^2$ carbon atoms is in the range of about 50-100%, about 60-100%, about 70-100%, about 80-100%, about 90-100%, or about 95-100%. In some embodiments, the second set of domains consists essentially of $sp^2$ hybridized carbon atoms.

The domains in the second set of domains may have any suitable domain size. As used herein, domain size refers to the largest characteristic dimension of a domain (e.g., a diameter, a length). In some embodiments, the domains in the first set of domains have an average domain size of at least about 1 nm, at least about 2 nm, at least about 5 nm, at least about 10 nm, at least about 15 nm, at least about 20 nm, at least about 25 nm, or at least about 30 nm. In some embodiments, the domains in the first set of domains have an average domain size in the range of about 1 nm to about 5 nm, about 1 nm to about 10 nm, about 1 nm to about 15 nm, about 1 nm to about 20 nm, about 1 nm to about 25 nm, about 1 nm to about 30 nm, about 5 nm to about 10 nm, about 5 nm to about 15 nm, about 5 nm to about 20 nm, about 5 nm to about 25 nm, about 5 nm to about 30 nm, about 10 nm to about 20 nm, about 10 nm to about 25 nm, about 10 nm to about 30 nm, or about 15 nm to about 30 nm.

In some embodiments, the domains in the second set of domains have an average domain size of at least about 1 nm, at least about 2 nm, at least about 3 nm, at least about 4 nm, at least about 5 nm, at least about 10 nm, at least about 15 nm, or at least about 20 nm. In some embodiments, the domains in the second set of domains have an average domain size in the range of about 1-2 nm, about 1-3 nm, about 1-4 nm, about 1-5 nm, about 1-10 nm, about 1-15 nm, about 1-20 nm, about 2-4 nm, about 2-5 nm, about 2-10 nm, about 2-15 nm, about 2-20 nm, about 5-10 nm, about 5-15 nm, or about 5-20 nm. Domain size may be determined by any method known in the art. For example, one method of determining domain size is Raman spectroscopy. In some embodiments, Raman spectra of graphene oxide compositions may exhibit a D peak and a G peak. The ratio of the intensity of the D peak, $I_D$, to the intensity of the G peak, $I_G$, may be compared to empirical data to estimate domain size. Domain size may also be determined from photoluminescence spectra. For example, photoluminescence emission peaks may be determined to correspond to domains comprising a certain number of aromatic rings. In some embodiments, the domains in the second set of domains may comprise an average of at least about 5 aromatic rings, at least about 10 aromatic rings, at least about 15 aromatic rings, at least about 20 aromatic rings, at least about 25 aromatic rings, at least about 30 aromatic rings, at least about 35 aromatic rings, at least about 40 aromatic rings, at least about 50 aromatic rings, or at least about 100 aromatic rings. In some embodiments, the domains in the second set of domains comprise an average number of aromatic rings in the range of about 5-25 aromatic rings, about 5-35 aromatic rings, about 5-50 aromatic rings, about 5-100 aromatic rings, about 15-25 aromatic rings, about 15-35 aromatic rings, about 15-50 aromatic rings, about 15-100 aromatic rings, about 25-50 aromatic rings, or about 50-100 aromatic rings. From the average number of aromatic rings in the domains of the second set of domains, an average domain size (e.g., largest characteristic dimension) of the domains in the second set of domains can be determined.

Domain size may be evaluated using, for example, Raman spectroscopy.

In some embodiments, methods disclosed herein comprise heating a first composition comprising a first graphene oxide species, thereby producing a second composition comprising a second graphene oxide species different from the first graphene oxide species (e.g., a phase-separated graphene oxide composition, a thermally annealed composition). The heating step may be performed, in some cases, at a relatively low temperature. A relatively low-temperature method may be advantageous because it may eliminate the need for expensive high-temperature systems and it may be highly scalable. In some embodiments, the heating step is performed at a temperature of about 150° C. or less, about 145° C. or less, about 140° C. or less, about 130° C. or less, about 125° C. or less, about 120° C. or less, about 110° C. or less, about 100° C. or less, about 90° C. or less, about 80° C. or less, about 70° C. or less, about 60° C. or less, about 50° C. or less, about 40° C. or less, or about 30° C. or less. In some embodiments, the heating step is performed at a temperature in the range of about 30° C. to about 80° C., about 30° C. to about 100° C., about 30° C. to about 125° C., about 30° C. to about 150° C., about 40° C. to about 80° C., about 40° C. to about 100° C., about 40° C. to about 125° C., about 40° C. to about 150° C., about 50° C. to about 80° C., about 50° C. to about 100° C., about 50° C. to about 125° C., about 50° C. to about 150° C., about 60° C. to about 80° C., about 60° C. to about 100° C., about 60° C. to about 125° C., about 60° C. to about 150° C., about 70° C. to about 100° C., about 70° C. to about 125° C., about 70° C. to about 150° C., about 80° C. to about 100° C., about 80° C. to about 125° C., about 80° C. to about 150° C., about 100° C. to about 125° C., and about 100° C. to about 150° C. In some embodiments, the heating step is performed at more than one temperature (e.g., the composition may be heated at a first temperature and then heated at a second temperature). The transition from a first temperature to a second temperature may be gradual or rapid. In some embodiments, the heating step is performed at any number of temperatures (e.g., at least two temperatures, at least three temperatures, at least five temperatures).

The heating step may be performed for any suitable period of time. In some embodiments, the heating step is performed for a period of at least about 4 days, at least about 5 days, at least about 6 days, at least about 7 days, at least about 8 days, at least about 9 days, at least about 10 days, at least about 11 days, at least about 12 days, at least about 13 days, at least about 14 days, at least about 15 days, at least about 16 days, at least about 17 days, at least about 18 days, at least about 19 days, at least about 20 days, at least about 21 days, at least about 22 days, at least about 23 days, at least about 24 days, or at least about 25 days. In some embodiments, the heating step is performed for a period in the range of about 4 days to about 9 days, about 4 days to about 10 days, about 4 days to about 15 days, about 4 days to about 20 days, about 4 days to about 20 days, about 5 days to about 9 days, about 5 days to about 10 days, about 5 days to about 15 days, about 5 days to about 20 days, about 5 days to about 25 days, about 9 days to about 15 days, about 9 days to about 20 days, about 9 days to about 25 days, about 10 days to about 20 days, or about 10 days to about 25 days. In some cases, aliquots of the composition are removed and analyzed at at least one intermediate time to characterize the composition and assess the progress of the method.

In some embodiments, the heating step is carried out at a relatively mild pressure. In some embodiments, the heating step is carried out at atmospheric pressure (e.g., about 1 atm, about 0.1 MPa). In some embodiments, the heating step is performed at a pressure of at least about $10^{-6}$ Pa, at least about $10^{-4}$ Pa, at least about $10^{-2}$ Pa, at least about 1 Pa, at least about $10^2$ Pa, at least about $10^4$ Pa, at least about $10^5$ Pa, at least about $10^6$ Pa, at least about $10^7$ Pa, at least about $10^8$ Pa, or at least about $10^9$ Pa. In some embodiments, the heating step is performed at a pressure of less than about $10^9$ Pa, less than about $10^8$ Pa, less than about $10^7$ Pa, less than about $10^6$ Pa, less than about $10^5$ Pa, less than about $10^4$ Pa, less than about $10^2$ Pa, or less than about 1 Pa. In some embodiments, the heating step is performed at a pressure in the range of about 1 Pa to about $10^5$ Pa, about 1 Pa to about $10^6$ Pa, about 1 Pa to about $10^9$ Pa, about $10^3$ Pa to about $10^5$ Pa, about $10^3$ Pa to about $10^6$ Pa, about $10^3$ Pa to about $10^7$ Pa, about $10^3$ Pa to about $10^9$ Pa, or about $10^5$ Pa to about $10^9$ Pa. In some cases, it is advantageous for the heating step to be performed at about atmospheric pressure, because it may eliminate the need for expensive high-pressure equipment or low-pressure equipment (e.g., ultra-high vacuum systems). In some cases, a method conducted under relatively mild temperature and/or pressure conditions may be advantageously carried out on a large scale.

In some embodiments, the heating step is carried out in the absence of a chemical reagent capable of reacting with the first graphene oxide species. As used herein, a chemical reagent refers to a species with which graphene oxide reacts, causing formation or breakage of a bond of the graphene oxide species, or otherwise facilitating reaction of the graphene oxide species to produce a different species (e.g., a different graphene oxide species). A chemical reagent does not refer to species that are inert to the graphene oxide species (e.g., fluid carriers) or sources of energy such as light, temperature or changes in temperature, electrical energy, acoustic energy, or the like. In some embodiments, the heating step is carried out in the absence of a reducing agent. Non-limiting examples of reducing agents include hydrazine, dimethylhydrazine, hydroquinone, NaBH$_4$, N,N-dimethylacetamide, mixtures thereof, or the like. In some embodiments, the heating step is carried out in the absence of a base. In certain cases, the base may be a strong base. Examples of strong bases include, but are not limited to, potassium hydroxide, sodium hydroxide, lithium hydroxide, rubidium hydroxide, cesium hydroxide, calcium hydroxide, barium hydroxide, and strontium hydroxide. In some embodiments, the heating step is carried out in the absence of an acid (e.g., ascorbic acid). In some embodiments, the method is carried out at a neutral pH (e.g., a pH of about 7). In some embodiments, the method is carried out at a pH of about 6, about 6.5, about 7, about 7.5, or about 8.

It may be advantageous, in certain cases, for a method to be carried out in the absence of such chemical reagents as the use of hazardous chemicals may be avoided. Additionally, the lack of chemical reagent use may result in a composition comprising a graphene oxide species that has a higher oxygen content than a composition produced by a method that is carried out in the presence of a chemical reagent. This may be the case if, for example, the chemical reagent reacted with the first graphene oxide species to reduce the first graphene oxide species to a graphene species.

In some embodiments, the method involves heating the first graphene oxide species in the absence of any other components (e.g., neat graphene oxide). In some embodiments, the method involves heating the first graphene oxide species in combination with a fluid carrier.

In some embodiments, the heating step results in a second composition comprising a second graphene oxide species different from the first graphene oxide species (e.g., a phase-separated graphene oxide composition, a thermally annealed graphene oxide composition), as described herein. The heating step may cause at least some of the oxygen-containing groups of the first graphene oxide species to rearrange and/or migrate to a different location on the surface of the graphene oxide. In some embodiments, the second composition therefore comprises a first set of domains comprising carbon atoms substituted with oxygen-containing groups and a second set of domains comprising carbon atoms that are not substituted with oxygen-containing groups. Without wishing to be bound by a particular theory, the phase separation may be driven by an increase in energy (e.g., thermal energy, electrical energy). For example, an increase in temperature may promote oxygen diffusion (e.g., diffusion of hydroxyl groups and/or epoxy groups along the graphene basal plane). By increasing temperature, the energy of an oxygen-containing functional group may increase, and the activation barrier of the oxygen-containing functional group may be overcome. The diffusion length of an oxygen-containing functional group may be estimated, for example, using Equations 1 and 2:

$$D = \frac{1}{4}d^2 k_0 \exp\left(\frac{-E_a}{kT}\right) \quad (1)$$

$$L \sim \sqrt{(Dt)} \quad (2)$$

where D is diffusivity, L is diffusion length, d is jump length, $k_0$ is attempt frequency, $E_a$ is activation energy, k is the Boltzmann constant, T is temperature, and t is time. As a non-limiting example, an epoxy functional group having a jump length of 1.23 angstroms, an attempt frequency of 26 THz, and an activation barrier of 0.83 eV, may, after 9 days of heating at 80° C., have an estimated diffusion length on the order of about 330 nm. In some cases, rate of diffusion may be higher for compositions in solid form (e.g., a powder, a thin film) than compositions comprising a fluid carrier such as water. Without wishing to be bound by a particular theory, water molecules in a suspension of graphene oxide may stabilize the graphene oxide by forming interactive networks with the oxygen-containing groups via hydrogen bonding, thereby slowing diffusion of oxygen molecules. As a result, larger changes in optical and/or electrical properties may be observed for graphene oxide compositions in the form of a powder or a thin film rather than a suspension.

In certain cases, phase separation may be thermodynamically favorable. For example, the total energy of a composition comprising a graphene oxide species may decrease with increasing phase separation (e.g., increasing graphitic domain size). Without wishing to be bound to a particular theory, this may be due to strain compensation (e.g., strain relief) in graphene oxide compositions. For example, while two oxygen groups attached on either side of the graphene sheet increase strains in their vicinity, the same oxygen groups can partially cancel the strains when present in proximity to one another. This may favor clustering of oxygen atoms in oxidized domains on graphene. Larger graphitic domains may be thermodynamically preferred to decrease the number of interfaces and the associated interfacial energy between oxidized and graphitic domains.

In some embodiments, the heating step may result in a relatively low loss of oxygen from graphene oxide. In some embodiments, the atomic % of oxygen in the second graphene oxide species (e.g., the treated graphene oxide species) is at least about 50% of the atomic % of oxygen in the first graphene oxide species (e.g., the untreated graphene oxide species), at least about 60% of the atomic % of oxygen in the first graphene oxide species, at least about 70% of the atomic % of oxygen in the first graphene oxide species, at least about 80% of the atomic % of oxygen in the first graphene oxide species, or at least about 90% of the atomic % of oxygen in the first graphene oxide species. In some embodiments, the atomic % of oxygen in the second graphene oxide species is in the range of about 50% to 60% of the atomic % of oxygen in the first graphene oxide species, about 50% to 70% of the atomic % of oxygen in the first graphene oxide species, about 50% to 80% of the atomic % of oxygen in the first graphene oxide species, about 50% to 90% of the atomic % of oxygen in the first graphene oxide species, about 60% to 70% of the atomic % of oxygen in the first graphene oxide species, about 60% to 80% of the atomic % of oxygen in the first graphene oxide species, about 60% to 90% of the atomic % of oxygen in the first graphene oxide species, about 70% to 90% of the atomic % of oxygen in the first graphene oxide species, or about 80% to 90% of the atomic % of oxygen in the first graphene oxide species.

In some embodiments, methods involving a relatively low loss of oxygen may produce graphene oxide species having a relatively high oxygen content. This may advantageously allow various optical and/or electrical properties to be tuned according to the needs of various applications. For example, such oxygen-containing groups, after rearrangement to form various domains on the surface of graphene oxide as disclosed herein, may be subsequently replaced with other, different functional groups.

In some embodiments, the atomic % of oxygen in the second graphene oxide species is greater than about 20 at %, greater than about 25 at %, greater than about 30 at %, greater than about 35 at %, greater than about 40 at %, greater than about 45 at %, or about 50 at %. In some embodiments, the atomic % of oxygen in the second graphene oxide species is in the range of about 21 at % to about 30 at %, about 21 at % to about 35 at %, about 21 at % to about 40 at %, about 21 at % to about 45 at %, about 21 at % to about 50 at %, about 25 at % to about 30 at %, about 25 at % to about 35 at %, about 25 at % to about 40 at %, about 25 at % to about 45 at %, about 25 at % to about 50 at %, about 30 at % to about 35 at %, about 30 at % to about 40 at %, about 30 at % to about 45 at %, or about 30 at % to about 50 at %.

In some embodiments, the heating step may result in a relatively low overall loss of mass. For example, prior to heating, a first composition comprising a first graphene oxide species may have a first mass. After heating, the resultant composition, a second composition comprising a second graphene oxide species, may have a second mass. In some embodiments, the percent mass loss is about 30% or less, about 25% or less, about 20% or less, about 15% or less, about 10% or less, or about 5% or less. In some embodiments, the percent mass loss is in the range of about 5% to about 10%, about 5% to about 15%, about 5% to about 20%, about 5% to about 25%, about 5% to about 30%, about 10% to about 15%, about 10% to about 20%, about 10% to about 25%, about 10% to about 30%, or about 15% to about 30%. The loss in mass may be determined by any method known in the art. For example, one method of measuring mass loss is through thermogravimetric analysis (TGA).

As described herein, compositions containing such phase-separated graphene oxide species may exhibit enhanced optical and/or electrical properties. For example, a composition comprising a thin film of phase-separated graphene oxide may have a lower electrical resistivity (e.g., a higher electrical conductivity) than as-synthesized graphene oxide (e.g., graphene oxide prior to heating), which is generally considered to be an insulator. In some embodiments, a thin film of phase-separated graphene exhibits a sheet resistance of about $1 \times 10^9$ ohms per square (ohms/sq) or less, about $1 \times 10^8$ ohms/sq or less, about $1 \times 10^7$ ohms/sq or less, about $1 \times 10^6$ ohms/sq or less, about $1 \times 10^5$ ohms/sq or less, about $1 \times 10^4$ ohms/sq or less, or about $1 \times 10^3$ ohms/sq or less. In some embodiments, a thin film of phase-separated graphene oxide exhibits a sheet resistance in the range of about $1 \times 10^3$ ohms/sq to about 1×10$^5$ ohms/sq, about 1×10$^3$ ohms/sq to about 1×10$^6$ ohms/sq, about 1×10$^3$ ohms/sq to about 1×10$^7$ ohms/sq, about 1×10$^3$ ohms/sq to about 1×10$^8$ ohms/sq, about 1×10$^3$ ohms/sq to about 1×10$^9$ ohms/sq, about 1×10$^5$ ohms/sq to about 1×10$^6$ ohms/sq, about 1×10$^5$ ohms/sq to about 1×10$^7$ ohms/sq, about 1×10$^5$ ohms/sq to about 1×10$^8$ ohms/sq, about 1×10$^5$ ohms/sq to about 1×10$^9$ ohms/sq, about 1×10$^6$ ohms/sq to about 1×10$^7$ ohms/sq, about 1×10$^6$ ohms/sq to about 1×10$^8$ ohms/sq, about 1×10$^6$ ohms/sq to about 1×10$^9$ ohms/sq, or about 1×10$^7$ ohms/sq to about 1×10$^9$ ohms/sq. The sheet resistance of the thin film may be measured according to any method known in the art. For example, one method of measuring sheet resistance is by using a four-point probe.

In some embodiments, a second (e.g., treated) graphene oxide composition exhibits enhanced optical properties. In some embodiments, the second graphene oxide species has a relatively small band gap. One of ordinary skill in the art would understand that a band gap generally refers to the energy difference between the top of a valence band and the bottom of a conduction band in a material. For example, the band gap may be the energy needed by a photon to create an exciton (e.g., an electron and a hole). It may be advantageous for a composition to have a relatively small band gap so that photons are able to excite electrons to the conduction band. In some embodiments, the composition comprising phase-separated graphene oxide has a band gap of about 5 eV or less, about 4 eV or less, about 3 eV or less, about 2.5 eV or less, about 2 eV or less, about 1.5 eV or less, about 1 eV or less, or about 0.5 eV or less. In some embodiments, the composition comprising graphene oxide after heating has a band gap in the range of about 0.5 eV to about 1 eV, about 0.5 eV to about 1.5 eV, about 0.5 eV to about 2 eV, about 0.5 eV to about 2.5 eV, about 0.5 eV to about 3 eV, about 0.5 eV to about 4 eV, about 0.5 eV to about 5 eV, about 1 eV to about 1.5 eV, about 1 eV to about 2 eV, about 1 eV to about 2.5 eV, about 1 eV to about 3 eV, about 1 eV to about 4 eV, about 1 eV to about 5 eV, about 1.5 eV to about 2 eV, about 1.5 eV to about 2.5 eV, about 1.5 eV to about 3 eV, about 1.5 eV to about 4 eV, or about 1.5 eV to about 5 eV.

In some embodiments, the second (e.g., treated) graphene oxide species absorbs photons in the visible range (e.g., between 350 nm and 800 nm, between 400 nm and 700 nm). In contrast, the first (e.g., untreated) graphene oxide species generally absorbs photons in the ultraviolet range. Without wishing to be bound by a particular theory, increase in absorbance of visible light may be attributed to the growth of graphitic domains within an sp$^3$ matrix in the composition comprising the second graphene oxide species. In some embodiments, the second graphene oxide species absorbs more photons in the visible range than the first graphene oxide species when placed under essentially identical conditions. In some embodiments, the second graphene oxide species absorbs at least about 10% more photons, at least about 20% more photons, at least about 30% more photons, at least about 35% more photons, at least about 40% more photons, at least about 45% more photons, at least about 50% more photons, or at least about 60% more photons than the first graphene oxide species. In some embodiments, the percent increase in number of photons in the visible range absorbed by the second graphene oxide species compared to the first graphene oxide species under essentially identical conditions is in the range of about 10% to about 20%, about 10% to about 30%, about 10% to about 40%, about 10% to about 50%, about 10% to about 60%, about 20% to about 40%, about 20% to about 50%, about 20% to about 60%, about 30% to about 50%, or about 30% to about 60%. The number of photons in the visible range absorbed may be calculated and/or measured by any suitable method. One method of calculating the number of photons absorbed is by using formula (3):

$$P = \int_{350}^{800} G(\lambda), \kappa(\lambda) d\lambda \quad (3)$$

where G refers to Air Mass 1.5 Global (AM 1.5 G) solar irradiance data published by the American Society for Testing and Materials (ASTM) and κ refers to ultraviolet-visible (UV-Vis) absorbance data obtained from the compositions.

Compositions comprising graphene oxide species as described herein (e.g., phase-separated graphene oxide species) may be characterized using any form of spectroscopy. For example, graphene oxide compositions may be characterized by UV-Vis absorption spectroscopy, photoluminescence spectroscopy, Fourier transform infrared spectroscopy (FTIR), X-ray photoelectron spectroscopy (XPS), Raman spectroscopy, Auger electron spectroscopy, and the like. In general, a spectrum obtained for a composition via a spectroscopic method may comprise one or more peaks. The peaks may correspond, for example, to the emission of radiation (e.g., ultraviolet radiation, visible light) following excitation and subsequent relaxation of an electron. A first spectrum comprising a first peak may generally be obtained for a first composition comprising as-synthesized graphene oxide (e.g., prior to heating). The first peak may have a first intensity (e.g., maximum intensity) and may have a first peak emission wavelength (e.g., the wavelength at which the maximum intensity occurs). A second spectrum comprising a second peak may be obtained for a second composition comprising a second graphene oxide species (e.g., after heating). The second peak may have a second intensity and a second peak emission wavelength. In some cases, the second intensity may be greater than the first intensity. In some cases, the second intensity may be less than the first intensity. In some cases, the second peak emission wavelength may be less than the first peak emission wavelength (e.g., the second peak may be blue-shifted relative to the first peak). In some cases, the second peak emission wavelength may be greater than the first peak emission wavelength (e.g., the second peak may be red-shifted relative to the first peak). In some cases, the first spectrum and/or second spectrum may each comprise more than one peak. Any changes that occur between the first and second spectra may be independent for each peak. For example, if a first spectrum comprises peak A and peak B, in the second spectrum, the intensity of peak A may decrease while the intensity of peak B may increase, or vice versa. In some cases, the intensities of peaks A and B may both increase or decrease. Similarly, the peak emission wavelength of peak A may increase or decrease independently of the peak emission wavelength of peak B. As used herein, when a spectrum is described as exhibiting a peak emission wavelength, the term refers to the wavelength at which the maximum overall intensity occurs.

In some embodiments, the first and second compositions may be characterized using UV-Vis absorption spectroscopy. A first UV-Vis absorption spectrum may be obtained for a first composition comprising a first graphene oxide species, and a second UV-Vis absorption spectrum may be obtained for a second composition comprising a second graphene oxide species. The first spectrum may comprise a first peak, and the second spectrum may comprise a second peak. In certain embodiments, the first peak and the second peak may both have a peak emission wavelength around 230 nm, and both peaks may be attributed to π-π* transitions of C=C in amorphous carbon systems. In certain cases, the intensity of the second peak may be lower than the intensity of the first peak. In certain embodiments, there may be absorption in the visible region, which may be attributed to graphitic domains comprising predominantly $sp^2$ hybridized carbon atoms. In some embodiments, the intensity of absorption in the visible region may be greater in the second spectrum than in the first spectrum.

In some embodiments, the first and second compositions may be characterized using photoluminescence spectroscopy. In some cases, a first photoluminescence (PL) spectrum may be obtained for a first composition comprising a first graphene oxide species, and a second photoluminescence spectrum may be obtained for a second composition comprising a second graphene oxide species. One of ordinary skill in the art would understand that photoluminescence generally refers to the emission of radiation resulting from the absorption of a photon. For example, a photon may be absorbed and may result in an electron being excited and a hole being formed. As the excited electron relaxes, radiation (e.g., visible radiation) may be emitted. The emission at a certain wavelength (e.g., the peak emission wavelength) may appear in a PL spectrum as a peak located at the peak emission wavelength. In some embodiments, the first spectrum has a first peak at a first peak emission wavelength, and the second spectrum has a second peak at a second peak emission wavelength. In certain cases, the second peak emission wavelength is less than the first peak emission wavelength (e.g., the peak is blue-shifted). In some embodiments, the second peak emission wavelength is at least about 25 nm less, at least about 50 nm less, about 75 nm less, or at least about 100 nm less than the first peak emission wavelength. In some embodiments, the second peak emission wavelength is about 500 nm or less, about 475 nm or less, about 450 nm or less, or about 400 nm or less. In some embodiments, the second peak emission wavelength is in the range of about 400 nm to about 450 nm or about 400 nm to about 500 nm. In certain cases, peaks in the range of about 450 nm and/or in the range of about 2 eV to about 2.8 eV, which may be associated with the formation of graphitic domains, may have a higher intensity in the second spectrum than in the first spectrum.

In some embodiments, the first and second compositions may be characterized using FTIR. In some embodiments, a first spectrum for a first composition comprising a first graphene oxide species and a second spectrum for a second composition comprising a second graphene oxide species may be obtained. In some embodiments, both the first and second spectra may exhibit peaks associated with oxygen-containing group. In some cases, this may suggest that heating and resultant separation do not result in major removal of oxygen-containing groups from the graphene basal plane. In some embodiments, the second spectrum may exhibit an absorption peak attributed to the formation of graphitic domains. In certain cases, the absorption peak attributed to the formation of graphitic domains may occur around 1,580 $cm^{-1}$.

In some embodiments, the first and second compositions may be characterized using XPS. In some embodiments, a first spectrum for a first composition comprising a first graphene oxide species and a second spectrum for a second composition comprising a second graphene oxide species may be obtained. In certain cases, both the first and second spectra may exhibit a peak associated with C=C—C, a peak associated with C—O, and a peak associated with C=O and COOH. In some embodiments, the intensity of the peak associated with C=C—C may be higher in the second spectrum than in the first spectrum, and the intensity of the peaks associated with C—O and C=O/COOH may be lower in the second spectrum than in the first spectrum. This may suggest an increase in the formation of graphitic domains. In some embodiments, the oxygen spectra show no changes in the covalently bonded oxygen network.

In some embodiments, the second graphene oxide species is arranged in contact with one or more electrodes. In certain cases, the second graphene oxide species is arranged in a device. Non-limiting examples of devices include circuits, electronics, metal/semiconductor composites, chemical sensors, and biological sensors.

As used herein, the term "graphene oxide" or "graphene oxide species" is given its ordinary meaning in the art and generally refers to an oxygenated form of the common carbon allotrope graphene. As used herein, the term "graphene" is given its ordinary meaning in the art and refers to polycyclic aromatic molecules in which a plurality of carbon atoms are covalently bound to each other. The covalently bound carbon atoms form repeating units that generally comprise 6-membered rings, but can also form 5-membered rings and/or 7-membered rings. Accordingly, in graphene it appears as if the covalently bound carbon atoms (e.g., $sp^2$ carbon atoms) form a single layer having a basal plane comprising a fused network of aromatic rings. Graphene typically includes at least one basal plane containing interior carbon atoms of the fused network, and a perimeter or edge containing the terminal carbon atoms of the fused network. Generally, the side ends or edges of the graphene are saturated with hydrogen atoms. However, the graphene material may contain non-carbon atoms at its edges. It should be noted that the term "graphene" includes reference to both single atom layers of graphene and multiple layer stacks of graphene.

A graphene oxide species generally refers to a graphene species that has been functionalized with one or more oxygen-containing groups. Non-limiting examples of suitable oxygen-containing groups include hydroxyl groups, epoxy groups, carboxyl groups, carbonyl groups, lactol groups, and the like. The oxygen-containing groups may be attached to one or both sides of a graphene sheet. The oxygen-containing groups may be located in the basal plane of the graphene sheet. In some embodiments, the oxygen-containing groups are dispersed over at least one surface of the basal plane of the graphene sheet. In some cases, the oxygen-containing groups located in the basal plane are predominantly epoxy groups and/or hydroxyl groups. The oxygen-containing groups may be located at the edges of the graphene sheet. In some cases, the oxygen-containing groups located at the edges are predominantly carboxyl groups and/or lactol groups. In some embodiments, at least a portion of the oxygen-containing groups are attached to the carbon atoms of the graphene sheet by covalent bonds. Due to the presence of the oxygen-containing groups, a graphene oxide species typically comprises a mixture of $sp^2$ and $sp^3$ hybridized carbon atoms. The carbon atoms in a graphene oxide species that are substituted with oxygen-containing groups are generally $sp^3$ hybridized carbon atoms, while the carbon atoms that are not substituted with oxygen-containing groups are generally $sp^2$ hybridized carbon atoms. In some embodiments, the properties of a graphene oxide species are tuned by adjusting the ratio of $sp^2$ carbon atoms to $sp^3$ carbon atoms.

It should be appreciated that a graphene oxide species may be synthesized according to any method known in the art. For example, a graphene oxide species may be synthesized using the Hummers method, the Brodie method, the Staudenmaier method, or any other suitable method. The Hummers method may, for example, comprise oxidizing graphite powder using sulfuric acid, sodium nitrate, and potassium permanganate.

The terms "carboxyl group" or "carbonyl group" are recognized in the art and can include such moieties as can be represented by the general formula:

wherein W is H, OH, O-alkyl, O-alkenyl, or a salt thereof. Where W is O-alkyl, the formula represents an "ester." Where W is OH, the formula represents a "carboxylic acid." In general, where the oxygen atom of the above formula is replaced by sulfur, the formula represents a "thiolcarbonyl" group. Where W is a S-alkyl, the formula represents a "thiolester." Where W is SH, the formula represents a "thiolcarboxylic acid." On the other hand, where W is alkyl, the above formula represents a "ketone" group. Where W is hydrogen, the above formula represents an "aldehyde" group.

The term "substituted" is contemplated to include all permissible substituents of organic compounds, "permissible" being in the context of the chemical rules of valence known to those of ordinary skill in the art. In some cases, "substituted" may generally refer to replacement of a hydrogen with a substituent as described herein. However, "substituted," as used herein, does not encompass replacement and/or alteration of a key functional group by which a molecule is identified, e.g., such that the "substituted" functional group becomes, through substitution, a different functional group. For example, a "substituted phenyl" must still comprise the phenyl moiety and cannot be modified by substitution, in this definition, to become, e.g., a heteroaryl group such as pyridine. In a broad aspect, the permissible substituents include acyclic and cyclic, branched and unbranched, carbocyclic and heterocyclic, aromatic and nonaromatic substituents of organic compounds. Illustrative substituents include, for example, those described herein. The permissible substituents can be one or more and the same or different for appropriate organic compounds. For purposes of this invention, the heteroatoms such as nitrogen may have hydrogen substituents and/or any permissible substituents of organic compounds described herein which satisfy the valencies of the heteroatoms. This invention is not intended to be limited in any manner by the permissible substituents of organic compounds.

Examples of substituents include, but are not limited to, alkyl, aryl, aralkyl, cyclic alkyl, heterocycloalkyl, hydroxy, alkoxy, aryloxy, perhaloalkoxy, aralkoxy, heteroaryl, heteroaryloxy, heteroarylalkyl, heteroaralkoxy, azido, amino, halogen, alkylthio, oxo, acylalkyl, carboxy esters, carboxyl, carboxamido, nitro, acyloxy, aminoalkyl, alkylaminoaryl, alkylaryl, alkylaminoalkyl, alkoxyaryl, arylamino, aralkylamino, alkylsulfonyl, carboxamidoalkylaryl, carboxamidoaryl, hydroxyalkyl, haloalkyl, alkylaminoalkylcarboxy, aminocarboxamidoalkyl, alkoxyalkyl, perhaloalkyl, arylalkyloxyalkyl, and the like.

EXAMPLE 1

A mild thermal annealing procedure (50-80° C.) facilitating phase separation of graphene oxide (GO) into distinct oxidized and graphitic domains was demonstrated. The procedure involved no chemical treatments and allowed manipulation of as-synthesized GO structures on a large scale. As a result, large improvements in optical and electronic properties of GO were obtained while preserving its oxygen functionality. A strong increase in the visible absorption characteristics with respect to as-synthesized samples and significant tunability of optical gaps up to ~1 eV were demonstrated. Electronic conductivity was also increased by up to four orders of magnitude in manipulated GO structures. The experimental results were supported by molecular dynamics (MD) and density functional theory (DFT) calculations performed on a large set of realistic, disordered GO structures. It was demonstrated that as-synthesized GO structures are metastable and undergo phase separation under the influence of temperature that drives oxygen diffusion by overcoming the kinetic barriers for surface diffusion. These results, combined with the prospects of carefully applying common external stimuli such as temperature, dopants and gate voltage, could translate into manipulating and gaining significant control over the GO structures, leading to enhanced sheet properties without compromising on the oxygen content. Taken together, the results shed light on the stability of GO and open up renewed opportunities for large-scale processing of as-synthesized GO sheets for application in optoelectronics and renewable energy systems.

Results and Discussion

GO sheets were synthesized via the Hummers' method. Thermal annealing studies were performed on GO suspensions prepared by thoroughly exfoliating GO sheets in water (~0.5 wt. % solids). Two stock solutions were prepared by diluting this solution (10×), that were annealed for a course of 9 days; one at 50° C. (±1° C.) and the other at 80° C. (±1° C.) in a temperature-controlled oven. Annealing was performed at two different temperatures in order to understand the impact of kinetics on the resulting phase transformation processes. Aliquots were retrieved at regular intervals of 1, 3, 5, 7 and 9 days, and stored in a vacuum desiccator at room temperature for further characterization. A similar annealing procedure was performed starting with freeze-dried GO samples (hereafter referred to as fd-GO), in order to discount the effects of the solvent environment.

Figure 1B:
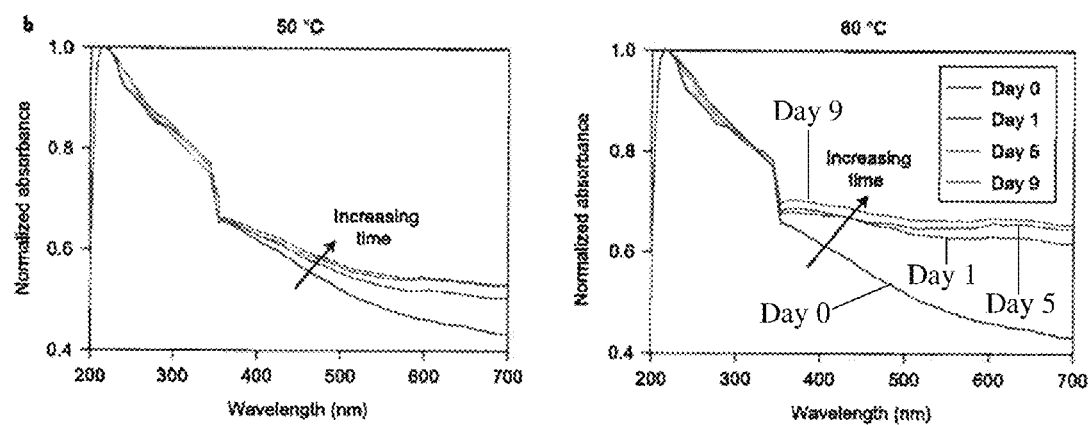
Figure 1C:
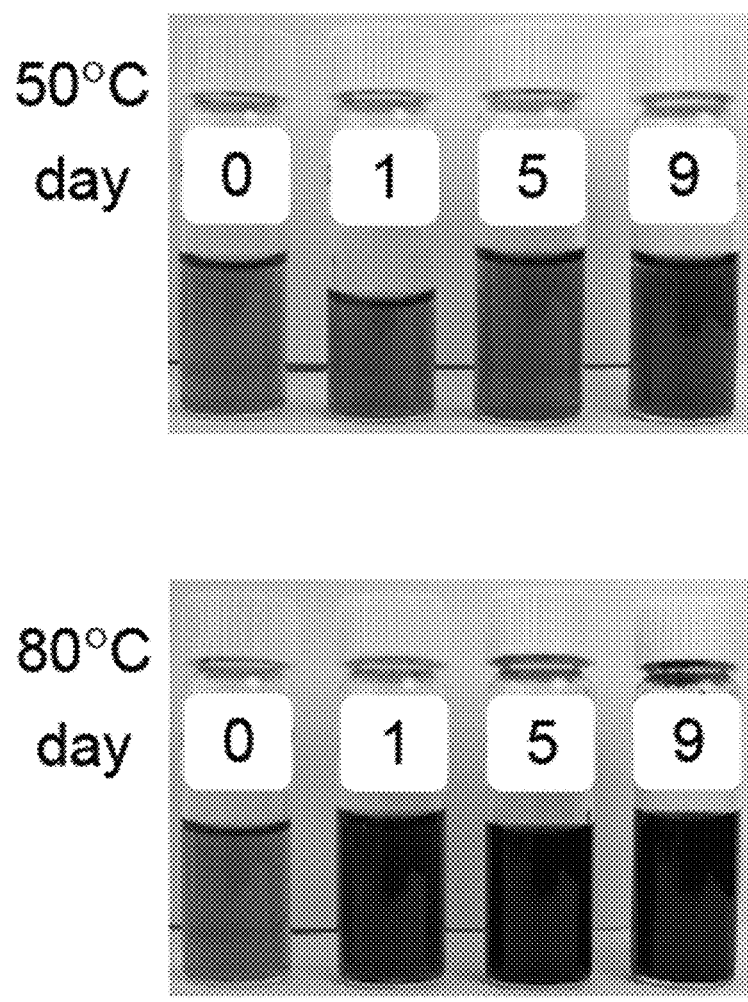

The evolution of the UV-Vis absorption spectra of GO suspensions with thermal annealing is shown in FIG. 1A. The as-prepared GO samples (day 0) showed typical characteristics of a main absorbance peak at ~230 nm attributed to π–π* transitions of C=C in amorphous carbon systems, and a broad absorption spectra in the visible. The main absorbance peak remained intact at ~230 nm upon annealing at both 50° and 80° C. in contrast to a clear red shift to ~260 nm reported in reduced GO (rGO) samples, indicating no major reduction in covalently-bonded oxygen at these temperatures. In addition, a broad shoulder at ~300 nm, attributed to n–π* transitions of C=0, was also observed during the entire course of thermal annealing. While a weak monotonic increment in the visible absorption was recorded with increasing annealing time at 50° C., GO samples annealed continuously at 80° C. became strongly absorbing in the visible, consistent with the stronger darkening of these GO samples (FIG. 1C). UV-Vis absorption studies on fd-GO samples yielded similar trends, but the observed effects were much stronger, as shown in FIG. 1B. For instance, the fd-GO samples annealed at 50° C. showed stronger changes in the absorbance curves compared to GO suspensions annealed at 50° C. To put these results in perspective, for example, in the context of solar cells, it was estimated that this increase in visible absorption corresponded to a significant 38% increase in the collection of photons in the wavelength range 350-800 nm, suggesting that annealed GO structures are amenable for efficient photovoltaics (see FIG. 5).

Figure 1D:
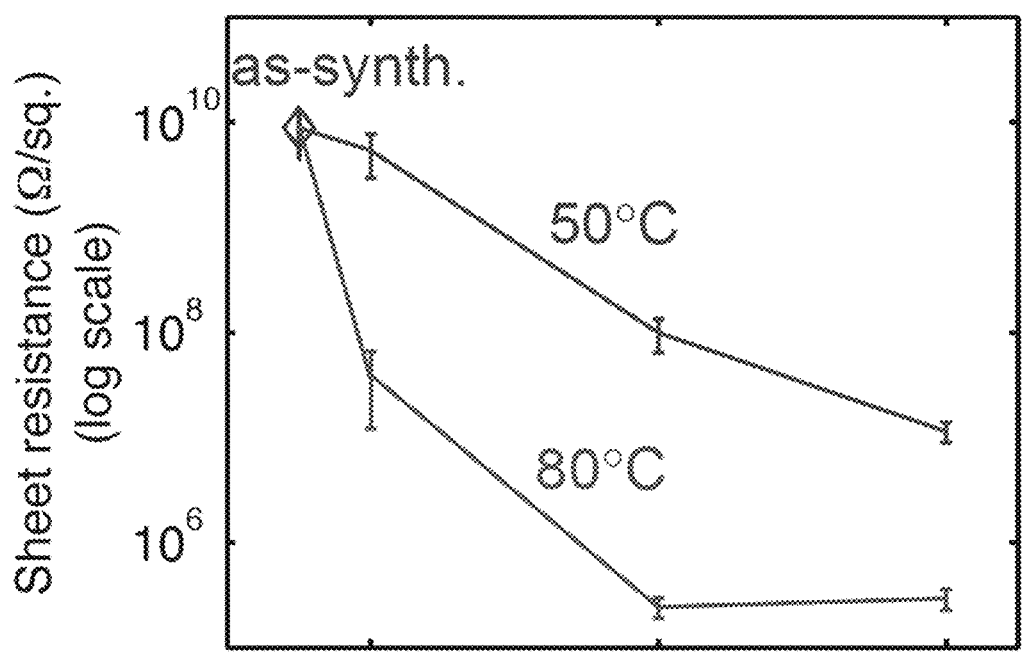

The electrical properties of thin films prepared from annealed GO samples were investigated using four-point probe transport measurements at room temperature. FIG. 1D shows that the sheet resistance values of GO films prepared from GO samples annealed at 50 and 80° C. were substantially lower than those prepared from as-synthesized GO samples. Significantly, low sheet resistances of ~3×10$^5$ Ω/sq. were measured in the case of the fd-GO samples annealed for 5 and 9 days at 80° C., respectively, which are four orders of magnitude lower than the resistance of the as-synthesized GO samples (~9×10$^9$ Ω/sq, comparable to 2-20×10$^9$ Ω/sq. reported previously), indicating superior electrical characteristics of annealed GO samples. Similarly, GO suspensions annealed at 50° C. showed no appreciable changes in the sheet resistance values, and GO suspensions annealed at 80° C. showed a reduction by up to two orders of magnitude over 9 days, which were consistent with stronger changes in the UV-Vis absorption data of fd-GO samples compared to GO suspensions (see FIGS. 1A and 1B). Overall, this simple annealing procedure may be effective in opening up new possibilities for fabricating devices with better electron transport characteristics than those afforded by as-synthesized GO.

Figure 2A:
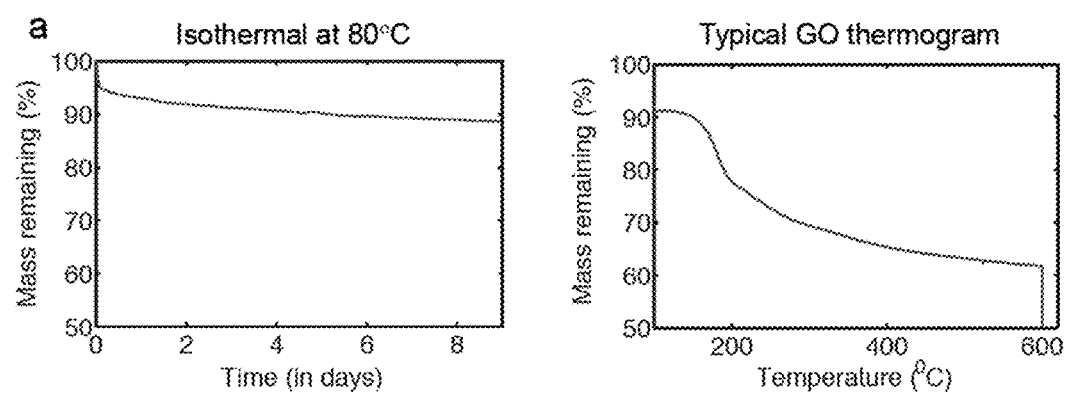
FIG. 2 shows (a) thermogravimetric thermograms for graphene oxide species, according to some embodiments; (b) FTIR spectra for graphene oxide species, according to some embodiments; (c) photoluminescence spectra for graphene oxide species, according to some embodiments; and (d) a schematic illustration of phase separation, according to some embodiments.

Although previous reports have shown enhanced electronic properties of GO under relatively low-temperature annealing between 25 to 150° C. and by combining them with suitable chemical treatments, such improvements have come at the expense of reduced oxygen content, leading to the formation of rGO. In this Example, while such drastic improvements in optical and electronic properties with a simple thermal annealing procedure are intriguing, it is equally worth noting that such improvements are obtained without a compromise in the covalently-bonded oxygen content and without being subjected to any chemical treatment. To confirm this, thermogravimetric analysis (TGA) was used to monitor the level of reduction of the GO samples by annealing them for 9 days at 80° C. (FIG. 2A). While the annealed sample showed an expected slight weight loss (~10%) over the entire course of annealing attributed to the elimination of physisorbed and interlamellar water, the thermogram of a typical as-synthesized GO sample showed an additional significant weight loss (~32%) at an onset temperature of 150° C. attributed to loss of covalently-bonded oxygen from the GO sheets. This result confirmed that the GO samples were not reduced during the entire course of thermal annealing, a fact additionally confirmed by X-ray photoelectron spectroscopy measurements (see FIG. 6). Collectively, these results suggested that the measured enhancement in optical and electronic properties did not come at the expense of oxygen atoms, instead indicating that a distinct mechanism inherent to the structure of GO was observed.

Figure 2B:
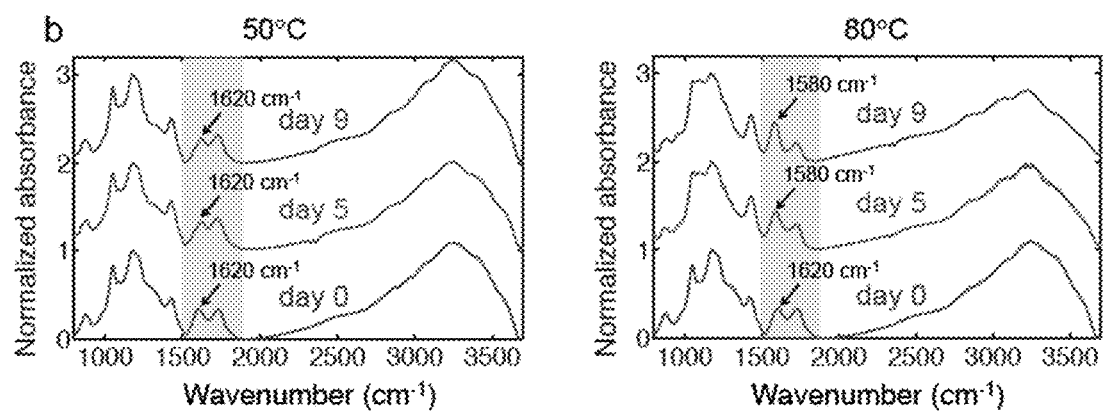
Figure 2C:
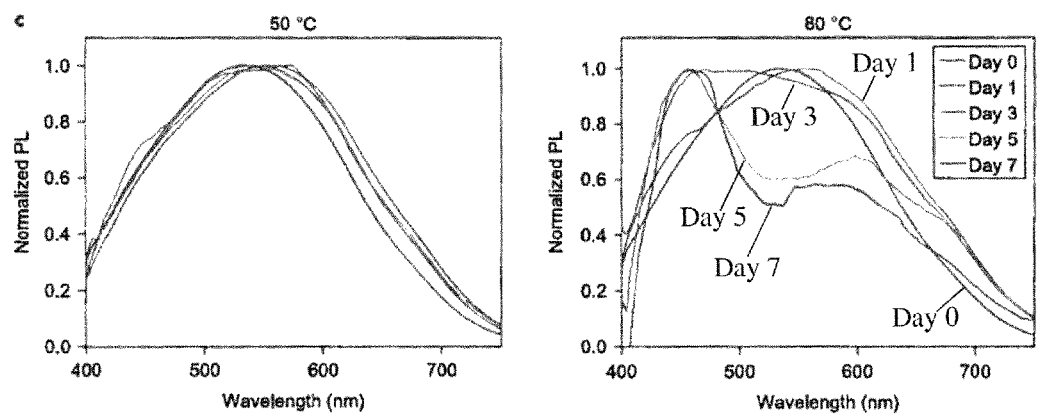

In order to probe the fundamental mechanism responsible for the enhancement in the visible absorption and electrical conductivity of annealed GO samples, a Fourier transform infrared spectroscopy (FTIR) study of GO samples during the course of annealing was carried out (FIG. 2B). Importantly, the recorded FTIR spectra showed the presence of oxygen functional groups for the entire course of annealing, confirming no major removal of oxygen groups from the graphene basal plane. As the GO samples were annealed at 50° C., the absorption peak at 1620 cm$^{-1}$, assigned to the C=C skeletal vibrations of graphitic domains or contribution from the deformation vibration of intercalated water (scissor mode), remained more or less unchanged. In case of annealing at 80° C., this peak intensity decreased, indicating loss of intercalated water consistent with our TGA results, and a prominent peak showed up with increasing intensity at 1580 cm$^{-1}$, attributed to the formation of prominent graphitic domains in GO. A similar FTIR study performed on fd-GO samples produced analogous results, ensuring the peak at 1580 cm$^{-1}$ was indeed due to graphitic domains (see FIG. 9). To further support this fact, a blue shift was observed in the photoluminescence (PL) spectra measurements on GO suspensions annealed at 80° C., which has been attributed to the formation of confined graphene domains in GO (FIG. 2C). The absence of a clear blue shift in the PL spectra of GO suspensions annealed at 50° C. correlated well with the FTIR spectra, suggesting lack of prominent graphitic domains in these samples. An increasing stacking of GO sheets was also observed, consistent with increasing r-conjugation and graphitization in the system (see FIG. 10). Taken together, the experimental results suggested that increasing formation of graphitic domains in annealed GO samples (with no loss in oxygen content) was mainly responsible for improved sheet characteristics.

Figure 2D:
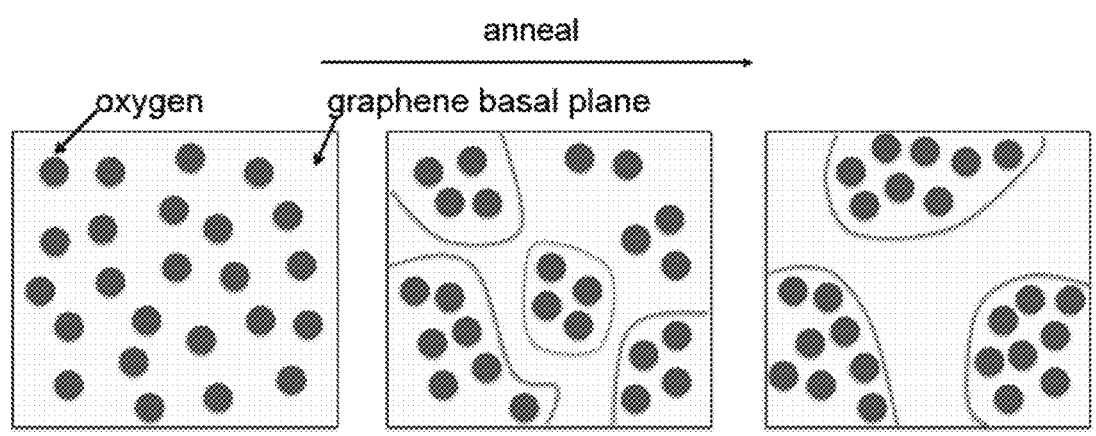

To interpret the experimental results, it was proposed that as-synthesized GO structures are metastable and have the potential to gradually separate into two distinct phases, graphitic and oxidized domains, driven by temperature as an external stimulus. FIG. 2D shows a schematic of the phase separation process of an as-synthesized mixed sp$^2$-sp$^3$ GO phase into distinct graphitic and oxidized domains, which results in continuous widening of graphene domains, and with longer annealing times may lead to the formation of percolating sp$^2$ networks in GO. Such confined graphene domains in a sp$^3$ matrix may open up optical gaps in the visible, which may explain the increasing visible absorbance and blue shift in PL observed here. Furthermore, this model explains the increasing electrical conductivity of GO thin films due to graphitization and formation of percolating sp$^2$ networks, with no loss in oxygen content. The smaller reduction of sheet resistance in GO suspensions compared to fd-GO samples is attributed to slower phase separation kinetics and incomplete formation of percolating sp$^2$ networks in GO suspensions.

Figure 3A:
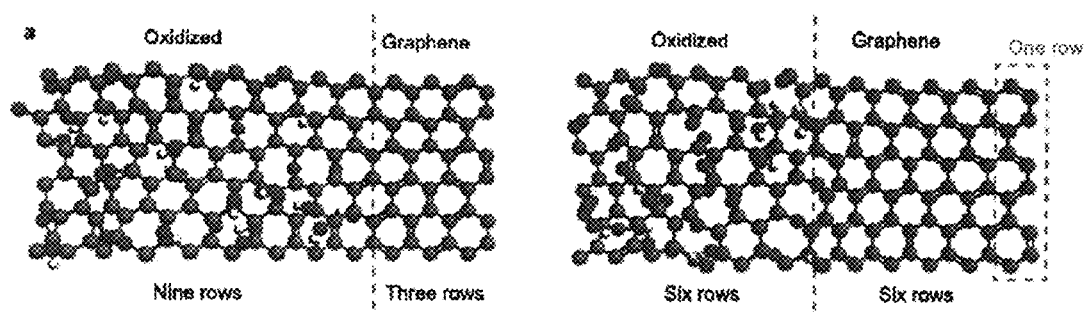
FIG. 3 shows (a) a schematic illustration of graphene oxide species, according to some embodiments; and (b) plots of total energy as a function of domain size for graphene oxide species, according to some embodiments.

A combination of classical MD and DFT was employed to further support this hypothesis. To compute the energetics of such a temporal phase separation process and to assess its favorability, model GO structures were generated using MD simulations based on accurate reactive force fields. GO structures were prepared with different sizes of oxidized and graphitic domains (0, 3 and 6 graphene rows) by keeping the oxygen concentration fixed, in order to mimic the phase separation process, as shown in FIG. 3A. Initially, the oxidized domains consisted of randomly distributed epoxy and hydroxyl groups attached to both sides of the graphene sheet. To account for local variations in oxygen concentration and fraction of functional groups along a GO sheet, oxygen concentrations (in at. % hereafter) of 10 and 20% were studied in the initial GO structures and samples with epoxy to hydroxyl ratios of 3:2 and 2:3.20 GO structures were then annealed at 300 K using classical MD simulations for structural stabilization (see Methods for further details).

Figure 3B:
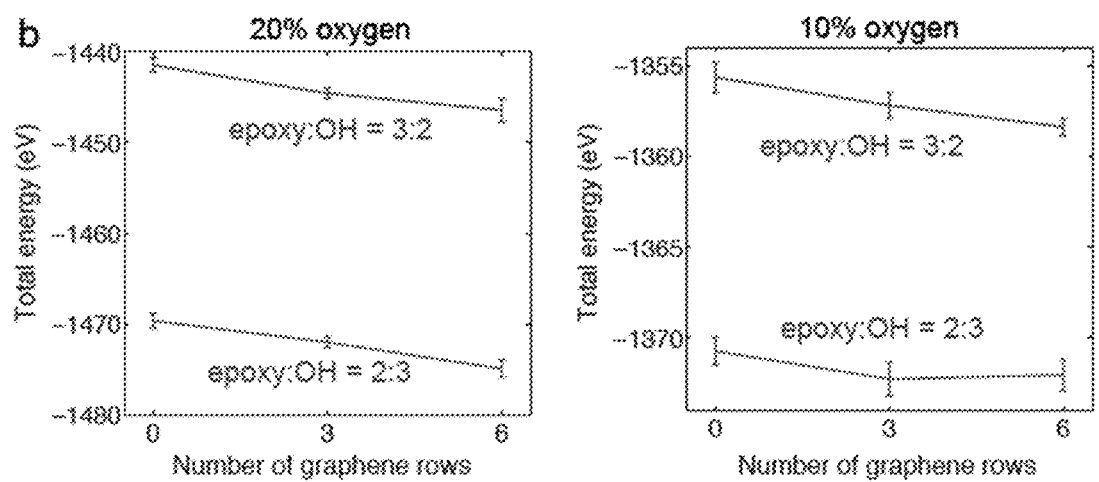

The thermal annealing simulations led to the formation of bare graphitic domains in conjunction with oxidized domains that largely contained epoxy and hydroxyl functional groups with a small amount of carbonyls and water molecules. The generation of a large number of samples (10 for each composition) allowed meaningful averages of the computed properties to be presented. FIG. 3B shows the total energy of the phase-separated GO structures computed from the MD simulations. It was observed that the total energies decrease with increasing phase separation, i.e. with increasing graphitic domain size, suggesting that the process of phase separation is thermodynamically favorable in GO structures. Additional calculations performed using chemically homogeneous and ordered phases of GO indicated similar trends and favorability of the phase separation process (see FIG. 11). This favorability may be attributed to strain compensation and hence strain relief in GO structures. For instance, while two isolated oxygen groups attached on either sides of the graphene sheet increase strains in their vicinity, the same oxygen groups can partially cancel these strains when present in proximity to one another, thus favoring phase separation and clustering of oxygen atoms on graphene. Using additional DFT calculations, it was further estimated that such confined graphene domains or channels formed within the $sp^3$-matrix open up a range of optical gaps depending on their size (0.5-2 eV), which explain the increase in visible absorbance observed (see FIG. 12), and suggest that such percolating graphene channels facilitate electron transport.

A key mechanism involved in the phase separation process may be the diffusion of epoxy and hydroxyl functional groups along the graphene basal plane. While an isolated epoxy group diffusion is limited by an activation barrier of 0.83 eV, the barrier for an isolated hydroxyl group diffusion is 0.30 eV, much lower than the epoxy case (see FIG. 4A). Furthermore, the kinetic barriers are known to be dependent on the environment around the diffusing oxygen group, and can exceed 1 eV in some cases. While diffusion of oxygen atoms at room temperature has been observed in GO multilayers previously, the structural changes were discernible only after months implying extremely low diffusion rates. This should explain why the phase separation structural transformations are not readily observable in GO stock solutions preserved at the room temperature, and hence warrant the application of external stimuli to activate these structural changes. Using the Arrhenius formula: $k=k_o \exp(-E_{act}/kT)$, where $E_{act}$ is the computed activation barrier, and $k_o$ is the attempt frequency (assumed to be constant), it was estimated that hydroxyl and epoxy diffusion increase by one and two orders of magnitude at 80° C. (353 K), respectively, compared to their diffusion at room temperature (300 K), which correlated well to the fact that structural changes were observed over 1-5 days rather than months.

Figure 4:
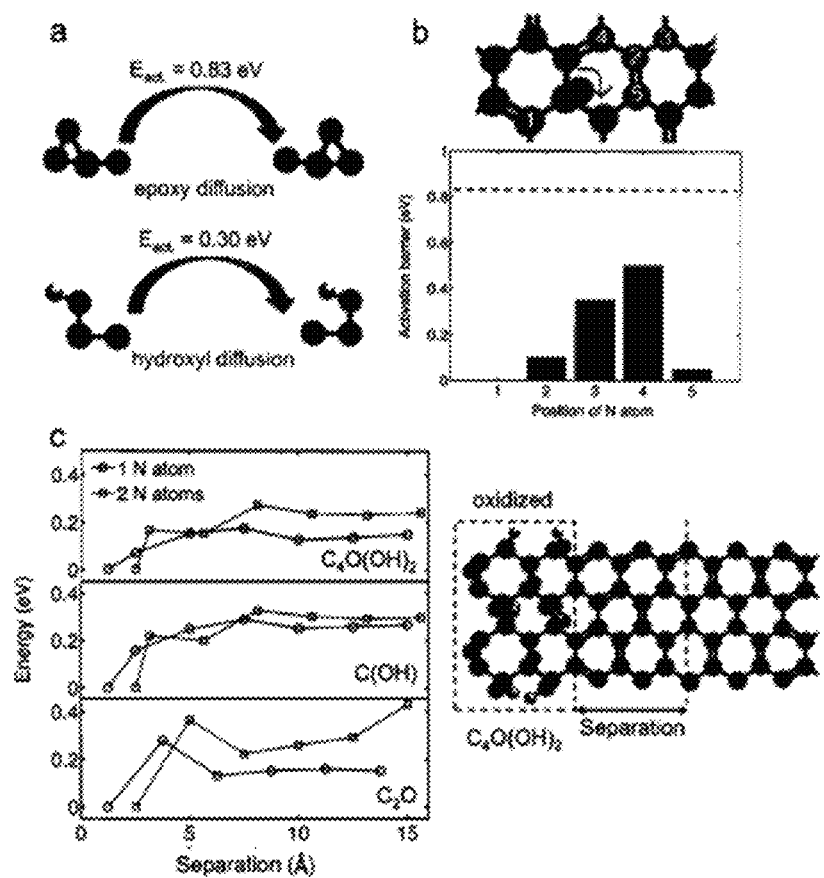
FIG. 4 shows (a) computed activation barriers for the diffusion of certain oxygen-containing functional groups, according to some embodiments; (b) a plot of computed activation barrier as a function of position of an n-dopant, for compositions according to some embodiments; (c) a plot of energy as a function of separation, for compositions according to some embodiments, and a schematic of a graphene oxide species, according to some embodiments.

While it has been demonstrated that temperature can be an effective external stimulus, the structural changes may be controlled by application of other external stimuli, such as gate voltage and N-doping, that could help to lower the activation barrier and promote easier diffusion of the epoxy groups. It has been shown that the kinetic barrier of a diffusing epoxy group decreases to 0.15 eV by controlling the extent of electron doping, translating into an increase of more than 9 orders of magnitude in the diffusion coefficient at room temperature. Calculations showed that N-doping of GO sheets can significantly lower the activation barriers and could even lead to a nearly barrierless diffusion of epoxy groups, depending on the positioning of the N atom relative to the diffusing epoxy group as shown in FIG. 4B. Additional DFT calculations performed on various oxygen domains in the vicinity of N dopants indicated favorable clustering of oxygen atoms closer to the N dopants than farther away from them (FIG. 4C), meaning that it should be possible to exercise spatial control over the oxidized domains by manipulating the positioning of N-dopants along the basal plane. The application of such external stimuli not only eases the diffusion process, but also provides considerable opportunities to control the positioning of the phase separated oxidized domains, and thus crucially tune their optical and electronic properties.

In summary, a simple annealing procedure involving no chemical treatments has been developed to manipulate as-synthesized GO suspensions and solids via the phase separation process, which is applicable to large scale processing of GO. Such structural transformation processes can have significant impact on the sheet properties by (1) making GO strongly absorbing in the visible, and (2) reducing the electrical resistance by four orders of magnitude, without compromising on the oxygen content. Atomistic calculations support the experimental results and show that the phase separation of GO into prominent oxidized and graphitic domains can be energetically favorable, and that the process can be accelerated by enabling diffusion of oxygen atoms under the application of suitable external stimuli such as temperature, gate voltage and N-doping. In addition to shedding light on the stability of GO when employed in devices operating above room temperature, these results open up novel opportunities for processing as-synthesized GO structures, and highlight pathways to tune the sheet properties of oxidized graphene for their application in next-generation functional devices.

Synthesis of GO

GO was prepared from synthetic graphite powder (~325 mesh, 99.9%, Alfa Aesar, MA, USA) using the Hummers' approach. The yellowish-brown filter cake obtained was suspended in 320 mL of water, to give a GO suspension of ~0.5 wt. % solids. The suspension was put in a sealed glass bottle and kept in a vacuum desiccator for long-term storage. It was observed that the stock suspension was stable at room temperature, without the addition of any surfactant.

Preparation of Freeze Dried GO Samples (fd-GO)

In order to study the effects of long-term thermal annealing on GO alone, and discount the effects of the solvent environment, dried samples were prepared from the stock suspension. The stock suspension was diluted to 10×, and 1 mL of this diluted suspension was taken in several eppendorf tubes, and they were solidified rapidly by plunging into liquid nitrogen. The frozen samples were put in a lyophilizer (Labconco FreeZone 2.5 Plus, MO, USA), and kept at 0.008 mbar pressure for a day for complete extraction of the water content from the samples. These samples were stored in a vacuum desiccator.

Time-Course Annealing of GO Samples

The effects of thermal annealing on both GO suspensions and fd-GO samples were studied. For GO suspensions, 1 mL of the 10× diluted stock solution was taken in 10 eppendorf tubes. For the fd-GO samples, the lyophilized samples were used as-is in 10 eppendorf tubes. One batch of 5 samples (both suspension and solids) was placed in a vacuum oven at 50° C., and another similar batch at 80° C. Both batches were started simultaneously at t=0. Then, at t=1, 3, 5, 7 and 9 days, 1 eppendorf tube was retrieved from each oven (both solid and liquid samples), and these were stored in a vacuum desiccator at room temperature for further characterization.

UV-Vis Absorbance Spectroscopy

GO suspensions obtained from annealing experiments were subjected to a vigorous vortex treatment and further sonicated for 20 mins. They were then diluted to 160× (of the stock suspension) for absorbance measurements. 100 microliters of sample was taken in a glass cuvette with a 1 cm path length. UV-visible absorbance was measured using a DU-800 Spectrophotometer (Beckman Coulter, CA, USA)

with respect to a water (blank) baseline. The scan range was 200-1100 nm, at a rate 600 nm/min. For the fd-GO samples, a Cary 300 spectrophotometer (Agilent Technologies, CA, USA) with a solid state sample accessory with z-height adjustment was used, operating in diffuse reflectance mode. The fd-GO samples were scanned from 200-800 nm at a scan rate of 1 nm/s. The reflectance measurements were converted into corresponding absorbance data after suitable background subtraction.

4-Point Probe Measurements

Electrical transport measurements of GO films prepared from annealed GO samples were carried out using a four-point probe technique (Model 2525, The Micromanipulator Company, NV, USA) at room temperature. GO samples were drop cast into 1 $cm^2$ area films on an insulating glass substrate. Measurements were taken by varying the applied voltage from −1 to +1V.

Infrared Spectroscopy

GO suspensions obtained from annealing experiments were freeze dried, and the FTIR spectrum (800-4000 $cm^{-1}$) was measured using a Thermo Fisher Continuum FHR Microscope in the transmission mode. A spot size of 100 pm was used. The transmission measurements were converted into corresponding absorbance data, and a suitable five-point baseline correction was applied to all spectra.

PL Measurements

PL from the GO samples was measured using a NanoLog spectrofluorometer (HORIBA Jobin Yvon, NJ, USA). The GO samples were diluted in water to 500× of the stock concentration. A CW Xenon-lamp with a monochromator was used for the excitation source and the samples were excited at 350 nm. The fluorescence was measured in the range 400-750 nm, using a FluoroHub single photon counter (HORIBA Jobin Yvon, NJ, USA), with an integration time of 0.1 s/nm.

Thermogravimetric Analysis

Thermal properties of GO were characterized by TGA (TA Instruments Q500 TGA). GO solids were initially equilibrated at 30° C. for 30 mins, which was followed by a ramp up to 80° C. where it was held isothermally for 9 days to record mass loss over the entire course of annealing. Typical GO thermograms were obtained by similar equilibration, followed by a ramp up to 800° C. All measurements were taken at a nitrogen gas flow rate of 40 ml/min and ramp rate of 5° C./mM was used.

Computational Methods

MD simulations used to prepare realistic GO structures were carried out using the LAMMPS package with the ReaxFF reactive force-field, chosen here for its ability to accurately describe bond-breaking and formation events in hydrocarbon systems. A time step of 0.25 fs and the NVT Berendsen thermostat was employed. To assess the energetics of the phase separation process into oxidized and graphitic domains, 3×1.3 nm periodic graphene sheets with different oxidized and graphitic domain sizes were considered. The oxidized domains contained randomly distributed epoxy and hydroxyl groups. The temperature of the GO sheets was increased from 10 K to 300 K over a time interval of 250 fs. The system was then annealed at 300 K for 250 ps to allow for structural stabilization. Such MD thermal anneal runs have been previously employed to generate both GO and reduced GO structures by us and other groups.

To study the impact of N-doping on the phase separation process, N-doped GO structures (4×0.8 nm) were used that were relaxed to less than 0.03 eV/A residual atomic forces using DFT with a plane-wave basis set as implemented in the VASP package. In all the DFT calculations presented in this work, the Projector Augmented Wave (PAW) method was used to describe the core electrons and the Perdew-Burke-Ernzerhof exchange-correlation (XC) functional was used in combination with a gamma-point k-grid. The wave function and charge density were expanded in plane waves with a wavefunction kinetic energy cut-off of 500 eV. A vacuum region of 16 Angstroms was used in the direction normal to the sheets. For computing the activation energies used to determine the kinetics of oxygen diffusion, nudged elastic band (NEB) calculations were used as implemented in VASP with 9-13 image structures between the reactant and the product.

EXAMPLE 2

Figure 13A:
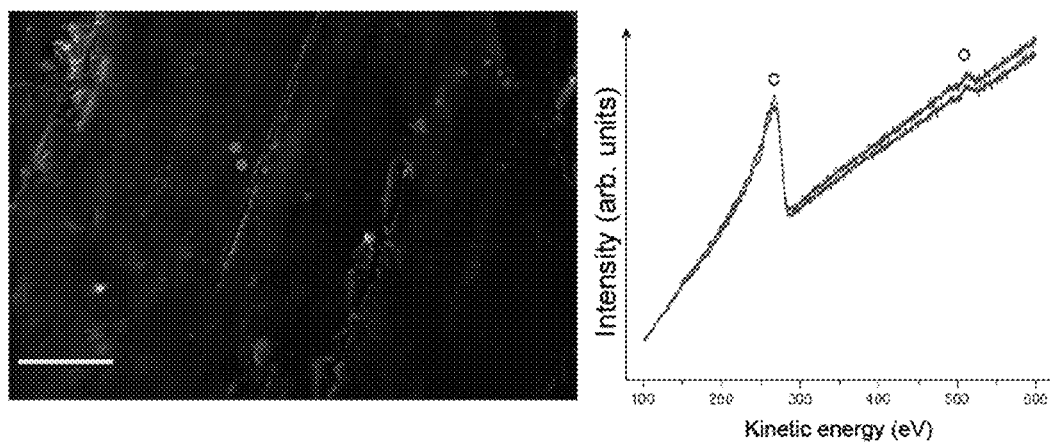
FIG. 13 shows (a) an image (left) and a plot of intensity as a function of kinetic energy (right) for a composition comprising a graphene oxide species, according to some embodiments; (b) Auger electron spectroscopy oxygen mapping of thin films comprising graphene oxide species, according to some embodiments.
Figure 13B:
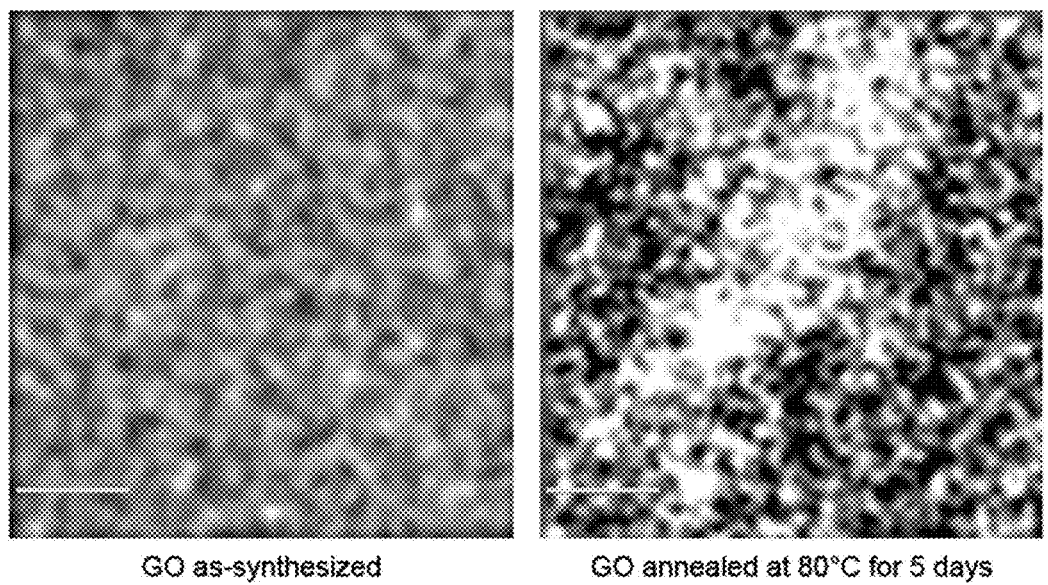

The compositions of Example 1 were further characterized. As a means to directly probe the structural transformations taking place in GO, Auger electron spectroscopy was performed on as-synthesized and annealed GO thin films (see Methods). The presence of carbon and oxygen on the surface was detected using this technique (FIG. 13A). FIG. 13B compares the elemental composition maps (oxygen-rich regions indicated by white spots) of as-synthesized and annealed GO thin films. The as-synthesized GO film shows a uniform oxygen composition, while the annealed film shows sharper and segregated regions of oxygen. These results further establish the process of oxygen clustering and development of well-defined graphene-rich domains upon annealing as-synthesized GO.

Additional analysis was conducted to estimate the range of domain sizes in annealed GO samples. Analogous to the case of phase separation in hybridized carbon boron nitride monolayers, the calculations also indicated that larger graphitic domains were thermodynamically preferred in order to decrease the number of interfaces and the associated interfacial energy between oxidized and graphitic domains (see FIG. 11). In order to understand the structural evolution of GO upon annealing, it is noted that the as-synthesized GO structure consists of two distinct features: (1) small $sp^2$ fragments (or chains) that correspond to no specific structure, and (2) larger unoxidized graphitic domains on the order of ~3 nm in size. On progressively annealing GO, the small $sp^2$ fragments are expected to interact and coalesce (or in other words, undergo the process of phase separation), leading to well-defined graphitic domains. On the basis of Raman and additional PL spectra from GO thin films, it was concluded that most of the domains were on the order of 1-2 nm (see FIGS. 15-16) and were mainly responsible for the observed blue-shift in the PL (2-2.5 eV).

In parallel, it is reasonable to expect the ~3 nm domains already present in as-synthesized GO to further grow upon annealing. It is expected that these domain sizes extend from ~3 nm to tens of nanometers, similar to the range of domain sizes observed in case of carbon boron nitride monolayers. DFT calculations showed that such large domains formed within the $sp^3$-matrix opened up optical gaps continuously up to 2 eV (see FIG. 12), which helped explain the continuous increase in the optical absorption spectra in both the visible and the infrared. Further, these estimates also explained why certain regions were relatively oxygen-rich compared to other regions in the AES maps. Although formation of such larger domains on the order of tens of nanometers requires considerable diffusion of oxygen groups, it was found that such mean diffusion lengths can nevertheless be achieved at the temperatures considered in this work. While results have been shown for as-synthesized GO samples with an oxygen content of ~30%, it is expected that these domain sizes would be tunable depending on the oxygen concentration, temperature and anneal time, providing additional opportunities for controlling the properties of oxidized graphene.

UV-Vis Data on GO Suspensions and Freeze-Dried (fd-GO) Samples

Figure 14:
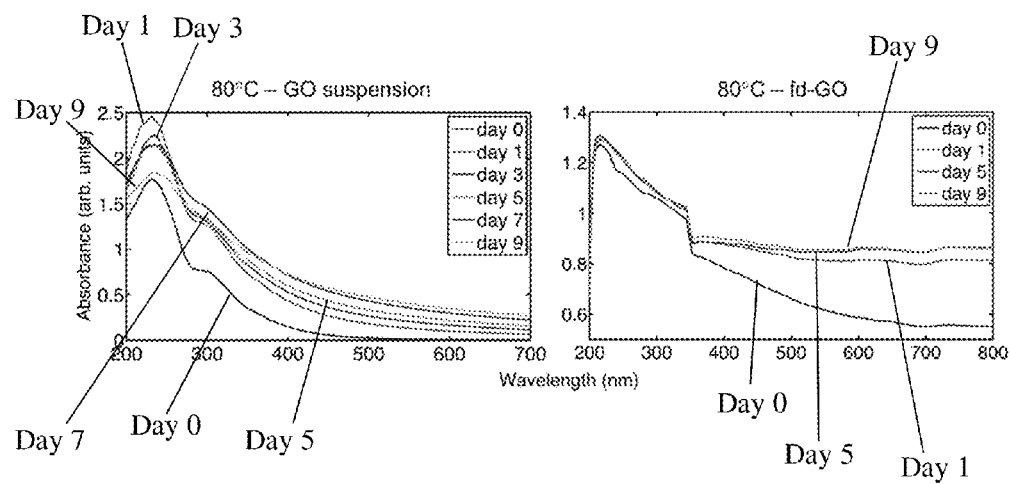
FIG. 14 shows un-normalized UV-Vis absorption spectra for suspensions comprising a graphene oxide species, according to some embodiments (left), and for solid compositions comprising a graphene oxide species (right), according to some embodiments.

FIG. 14 shows un-normalized UV-Vis absorption data for both GO suspensions and fd-GO samples annealed at 80° C. The concentrations were kept the same for comparison over different time intervals of annealing. The steep bump near 360 nm in case of the fd-GO sample was due to the change of detectors (from visible to UV).

It is noted that all of the annealed samples showed an increase in the UV-Vis absorption spectra in comparison with the as-synthesized GO sample. Further, the UV-Vis data on both sets of samples with anneal time showed a similar increasing visible absorption (400-700 nm) and decreasing UV absorption trend (200-300 nm). While the absorption peak at 230 nm has been attributed to the amorphous nature of GO (which leads to an optical gap of ~5.6 eV), the absorption in the visible can be attributed to the graphitic regions confined within the $sp^3$ matrix. The increasing visible absorption characteristics thus suggest prominent formation of these graphitic domains with annealing. Importantly, the overall increase in the visible absorption over the entire visible wavelengths suggests that these confined graphitic domains can be of various sizes and shapes.

The results also showed stronger changes in optical and electrical properties of fd-GO samples compared to GO suspensions. This effect can be attributed to likely higher kinetics of phase separation in the fd-GO samples, where the solvent environment (water) is absent. The water molecules present in the solvent are known to stabilize GO sheets by forming interactive networks with the oxygen functional groups via hydrogen bonding, which could be the likely cause for slower diffusion of oxygen molecules in exfoliated GO suspensions. This effect is largely absent in the case of fd-GO samples, which promotes faster diffusion of oxygen groups.

Calculation of Enhancement in Sunlight Absorption

Figure 5:
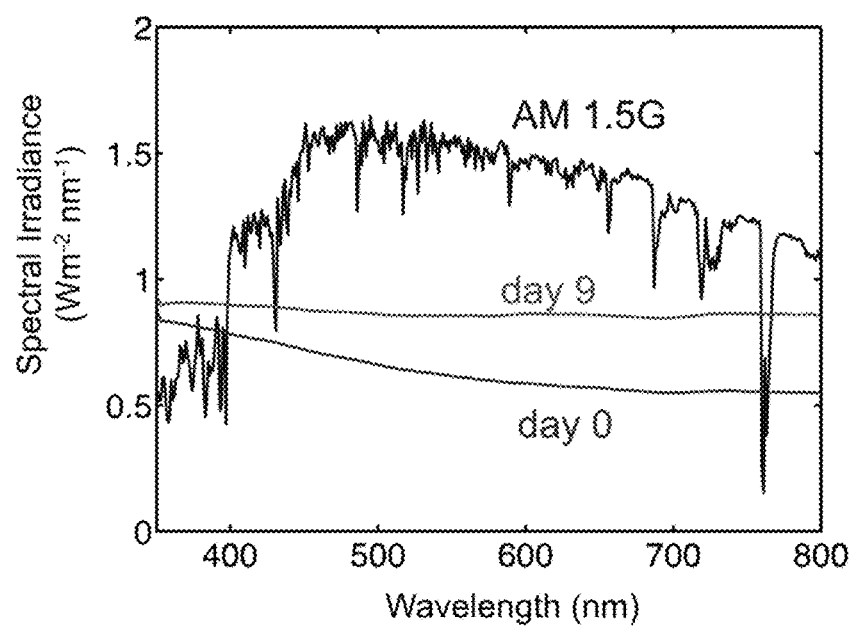
FIG. 5 shows a plot of spectral irradiance as a function of wavelength for embodiments described herein.

As shown in FIG. 5, the enhancement in sunlight absorption of annealed GO samples compared to as-synthesized GO samples was estimated using AM 1.5G solar irradiance data (denoted as G), and absorbance data (denoted as κ) of fd-GO samples annealed at 80° C. The net absorbance for the day 0 and day 9 cases was calculated using the formula:

$$P=\int_{350}^{800} G(\lambda).\kappa(\lambda)d\lambda$$

The ratio obtained showed an absorption enhancement of about 38% in the day 9 sample compared to the as-synthesized sample within the wavelength range 350-800 nm. This value would be expected to increase further if a wider wavelength range (including the infrared) was considered. Such an enhancement could have a significant impact on optoelectronic devices making use of GO.

3. X-Ray Photoelectron Spectroscopy (XPS) Measurements on Annealed GO Samples

X-ray photoelectron spectroscopy measurements were done using a PHI VersaProbe II Scanning XPS microprobe (Physical Electronics Inc., MN, USA). Al $K_\alpha$ source was used, with an incident X-ray photon energy of 1486.7 eV. The spot size was 200 μm, with a sample tilt of 45° and a hemispherical analyzer with a pass energy of 23.5 eV. The samples used for XPS were prepared by drop-casting GO suspensions on a clean Si susbtrate. In the case of fd-GO samples, in order to maintain consistency, annealed fd-GO samples were dispersed in water and then drop-casted onto a Si substrate.

All the XPS spectra were acquired under the same acquisition conditions. After acquiring the scans, the CasaXPS software (Casa Software Ltd.) was used for spectral data analysis. After a Shirley background subtraction and application of a Savitzky-Golay smoothing filter, and correction for the different X-ray cross-sections using the Scofield sensitivity factors, peaks were fitted to the spectra. The C is spectra were fitted to 3 Gaussian-Lorentzian peaks (C=C—C, C—O—C and C=O/HO—C=O) using the constraint of equal Gaussian-Lorentzian pre-factors, while leaving the full-width at half maximum (FWHM) of the peaks to be freely variable. A similar fitting technique was used for the O 1s spectrum.

(a) XPS Results on GO Suspensions

Figure 6:
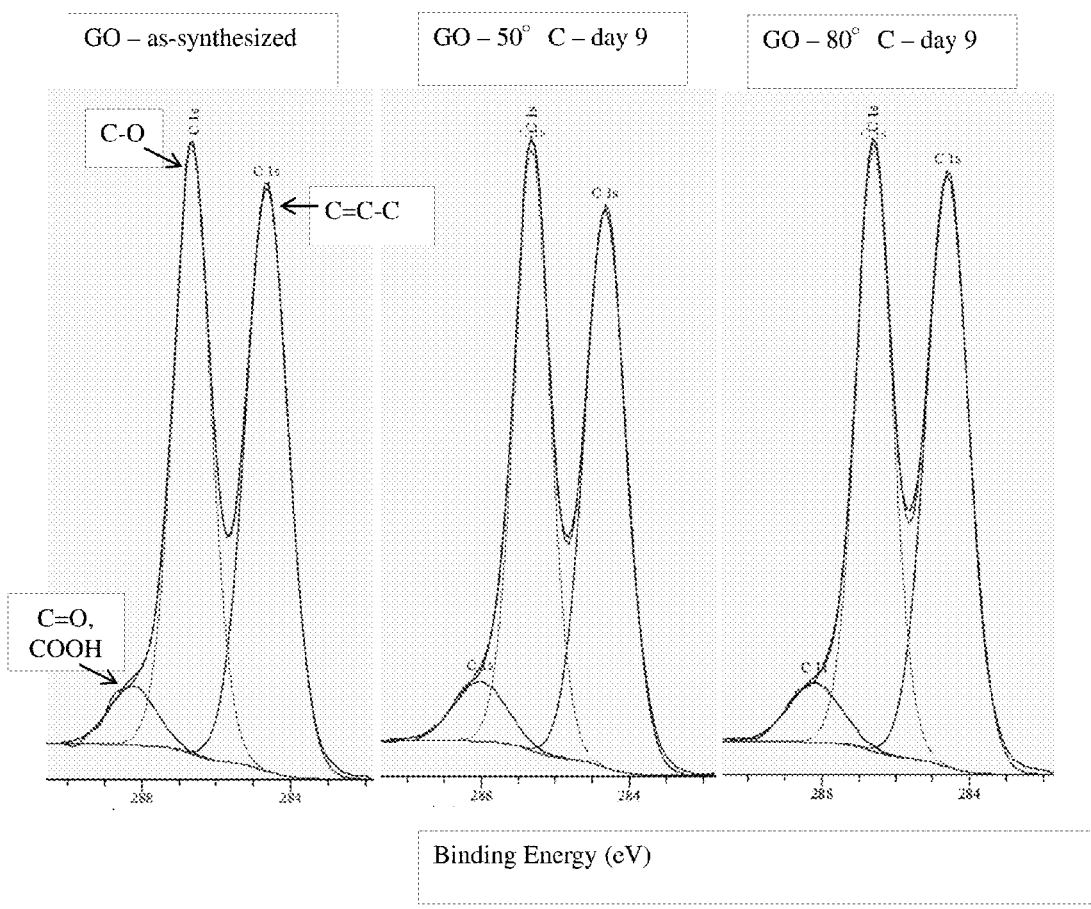
FIG. 6 shows X-ray photoelectron spectroscopy (XPS) data comparing carbon is spectra for suspensions comprising a graphene oxide species, according to some embodiments.

As shown in FIG. 6, XPS data comparing C 1 s spectra of GO suspensions annealed at 50 and 80° C. showed weak changes in the peak intensities compared to the as-synthesized sample even after the entire course of annealing, indicating weaker structural transformations and lower kinetics of phase separation in annealed GO suspensions. The calculated oxygen contents were ~34, 33 and 31 at % for as-synthesized GO, GO-50° C.-day-9 (annealed at 50° C. for 9 days) and GO-80° C.-day-9 samples, respectively.

(b) XPS Results on fd-GO Samples

Figure 7:
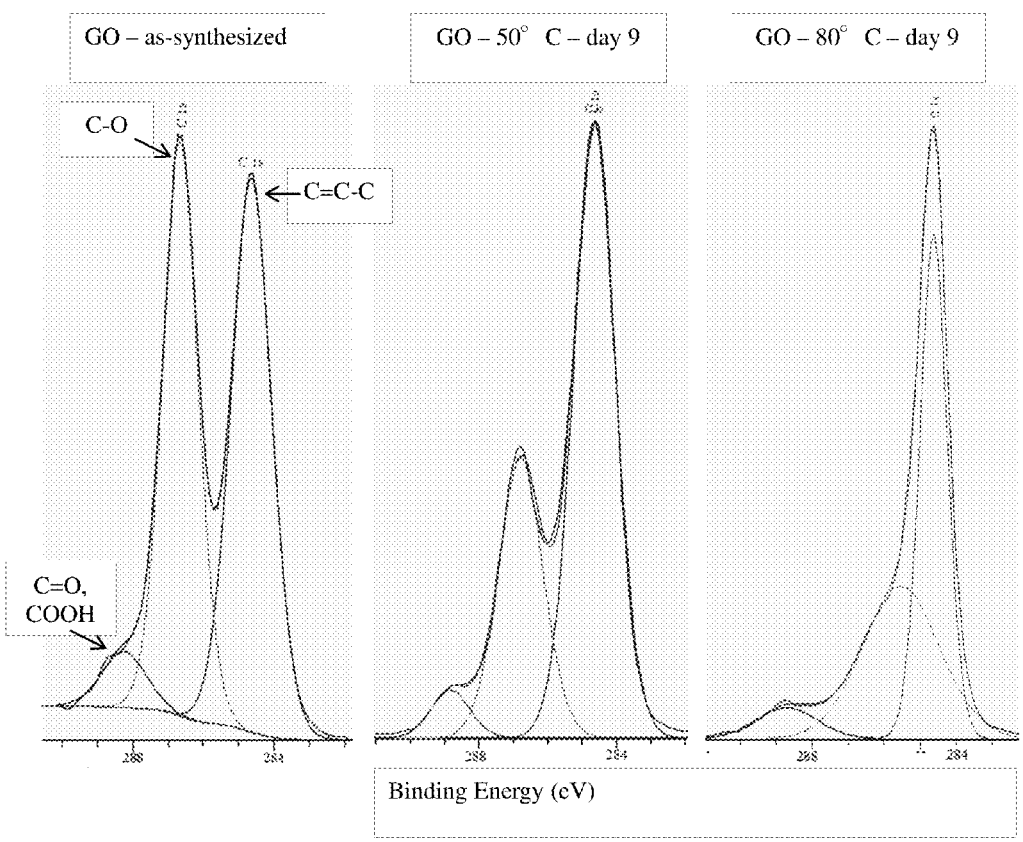
FIG. 7 shows XPS data comparing carbon is spectra for solid compositions comprising a graphene oxide species, according to some embodiments.
Figure 8:
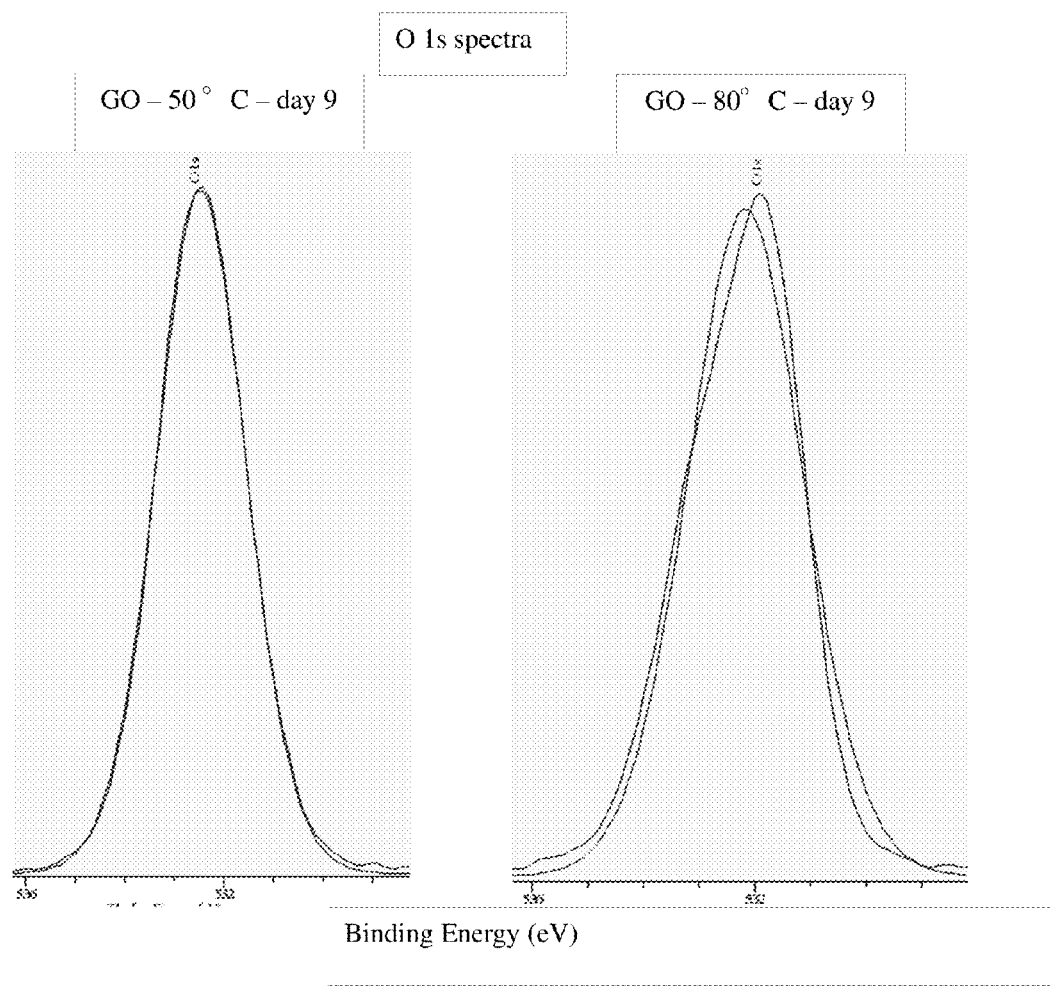
FIG. 8 shows XPS data comparing oxygen is spectra for solid compositions comprising a graphene oxide species, according to some embodiments.

As shown in FIG. 7, XPS data comparing C1s spectra of fd-GO samples annealed at 50 and 80° C. showed stronger relative changes in the peak intensities compared to the as-synthesized sample. Particularly, the C=C—C intensity increased relative to the C—O and C=O, COOH intensities, indicating prominent formation of graphitic regions in annealed fd-GO samples and supporting the hypothesis of phase separation in annealed GO. At the same time, the O1s spectra of annealed fd-GO samples shown in FIG. 8 indicated no changes to the covalently bonded oxygen network in annealed GO. The calculated oxygen contents were ~27 and 28 at % for GO-50° C.-day-9 and GO-80° C.-day-9 samples, respectively.

It has been shown that as-synthesized GO structures are metastable and can undergo a small amount of reduction with time due to the interaction between oxygen and chemisorbed H atoms at room temperature. It has been observed that GO samples with an O:C ratio of 0.44 get reduced to an O:C ratio of 0.38, which corresponds to a slight ~3 at. % reduction in oxygen. This reduction process could be expected to accelerate at the temperatures used in these experiments, and hence the slight reduction in oxygen content observed in the experiments can be attributed to this process. However, this reduction process is shown to be limited by the amount of C—H species and attain a steady state. Hence, this process is expected to play a minor role in the structural transformations observed that show continuous changes over 5 to 9 days at 80° C.

4. FTIR Measurements on fd-GO Samples

Figure 9:
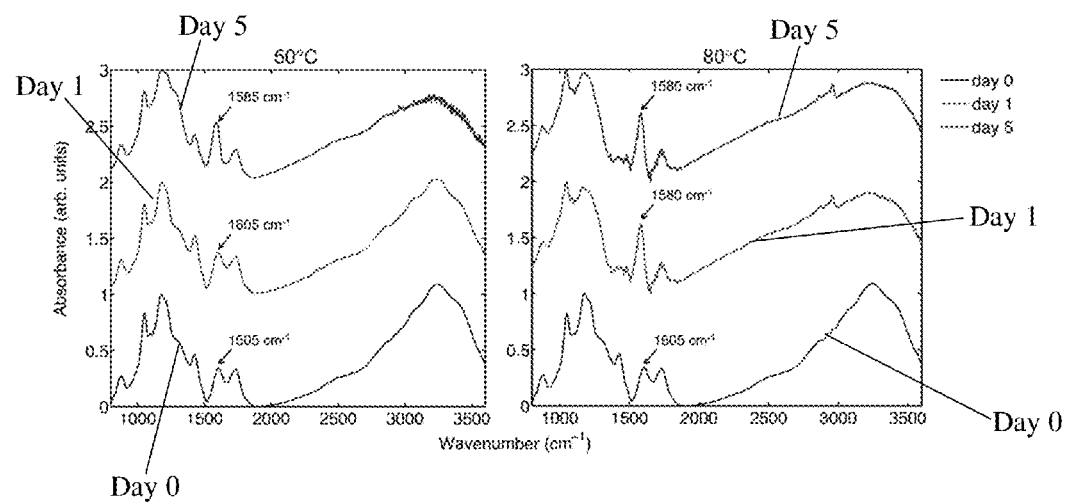
FIG. 9 shows FTIR spectra for solid compositions comprising graphene oxide species, according to some embodiments.

As shown in FIG. 9, FTIR measurements were performed on fd-GO samples during the course of annealing to discount the effects of the solvent environment (water in this case). As noted in Example 1, the effect of thermal annealing on fd-GO samples was much stronger compared to the case of GO suspensions, i.e. the structural transformations were accelerated in the fd-GO case. This fact was evident from the visible absorbance spectra (see Example 1, FIG. 1A, and FIG. 14) and was further supported by the FTIR spectra of fd-GO samples. For example, FTIR spectra of fd-GO annealed at 50° C. for 5 days already showed the C=C peak at 1585 cm$^{-1}$, which was not observed in the corresponding GO suspensions even after 9 days of annealing at 50° C.

These FTIR spectra further illustrate the disappearance of the water peak, usually observed above 1600 cm$^{-1}$, which is consistent with the TGA experiment that revealed loss of water (~10%, see Example 1). The formation of a new peak at around 1580 cm$^{-1}$ can thus be attributed to the formation of prominent C═C domains.

5. Additional Evidence for Phase Separation and Estimation of Graphitic Domain Size In order to further corroborate the hypothesis on clustering and prominent formation of sp$^2$ domains during thermal annealing, Raman analysis was performed on fd-GO samples, where the effects of annealing on structural transformations were much stronger. Unpolarized Raman spectra were recorded at room temperature on GO films prepared from annealed fd-GO samples on a glass substrate. Mapping images were acquired using Renishaw Raman/PL system with moving stage (100 nm precision) using 488 nm laser source and 100× short working distance optical lens (Olympus 100×).

Figure 15A:
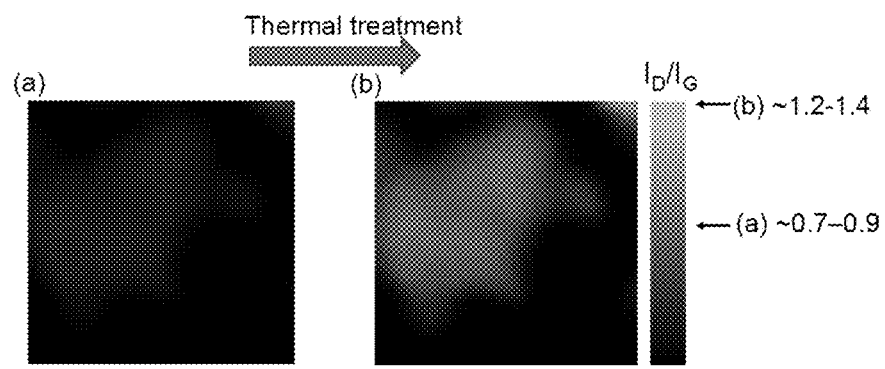
FIG. 15 shows (a) Raman mapping on solid compositions comprising graphene oxide species, according to some embodiments; and (b) Raman measurements on solid compositions comprising graphene oxide species, according to some embodiments.
Figure 15B:
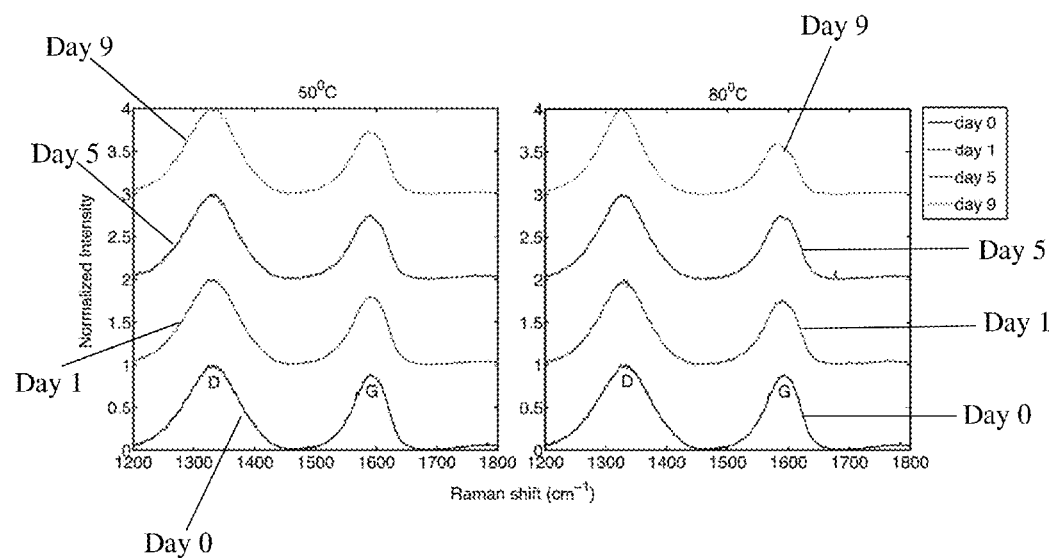

FIG. 15A shows Raman mapping on as-synthesized and annealed GO flakes (at 80° C. for 5 days). The mapping was performed in such a way that the brightness corresponds to the $I_D/I_G$ ratio. The annealed sample is clearly brighter and corresponds to a higher $I_D/I_G$ ratio. FIG. 15B shows Raman measurements on annealed fd-GO samples at different anneal times. The $I_D/I_G$ ratio increased from 1.14 to 1.37 for the 50° C. case, while the same increased from 1.14 to 1.75 for the 80° C. case.

The two prominent features obtained from GO samples (D and G peaks, as shown) were used to analyze the hypothesis of phase separation in annealed GO samples. It has been reported that in amorphous carbons, the development of a D peak indicates ordering and clustering of sp$^2$ domains, exactly opposite from the case of graphite. This trend has been observed in the high-defect regime in an amorphous carbon structure. Considering that GO is a 2D amorphous carbon nanomaterial, indeed, the Raman analysis showed an increasing $I_D/I_G$ ratio upon annealing GO samples at both 50 and 80° C., indicating ordering and prominent formation of graphitic domains upon thermal annealing. These changes were also more prominent at 80° C., showing the effect of annealing temperature on the kinetics of phase separation.

Figure 16:
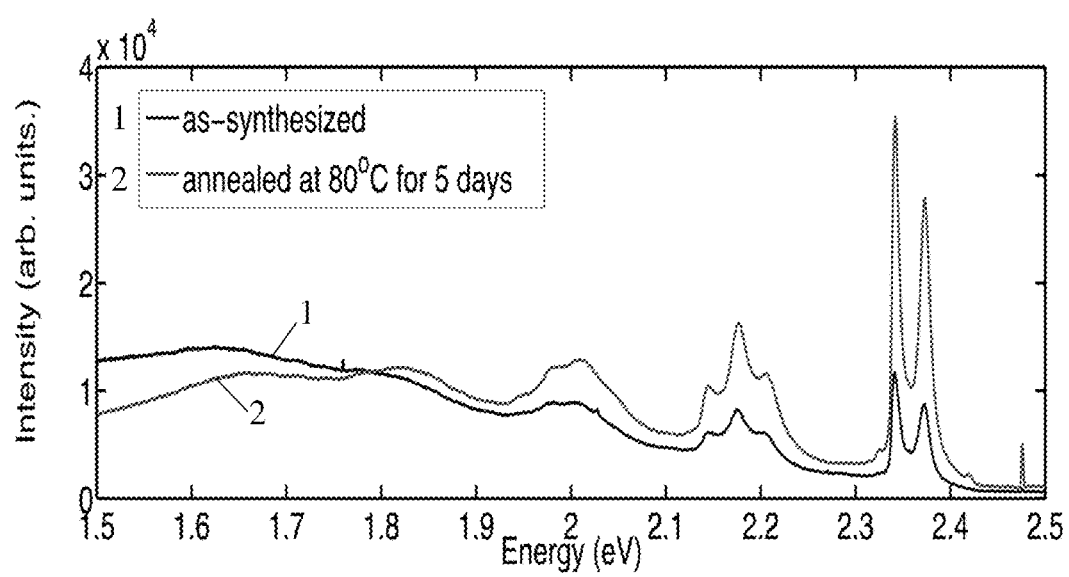
FIG. 16 shows photoluminescence spectra for thin films comprising graphene oxide species, according to some embodiments.

FIG. 16 shows PL measurements on as-synthesized and annealed GO thin films. As can be seen in FIG. 16, the PL emission was enhanced upon annealing. A new broad peak at 1.83 eV appeared, while the peaks at 2, 2.17 and 2.3-2.4 eV were enhanced significantly.

The graphitic domain size for this example can be estimated from Raman and PL analysis. The $I_D/I_G$ ratio indicates the graphitic domain size in an amorphous carbon sample. In the high-defect regime, the Tueinstra-Koenig relation is not applicable, and the domain sizes in this case do not exceed 2 nm in size. Comparing the $I_D/I_G$ ratio to empirical data, a domain size of ~1.8 nm was obtained for fd-GO samples annealed at 80° C. for 9 days. Thus, for this example, the domain sizes are expected to be on the order of 1-2 nm. It should be understood that, in other examples, other domain sizes are possible.

A significant enhancement in PL emission of annealed GO samples within the energy range 2-2.5 eV is shown in FIG. 16, and also at ~450 nm (2.75 eV) for annealed GO solutions as shown in Example 1. This emission (2-2.75 eV) corresponds to confined graphitic domains consisting of about 15-35 aromatic rings, that in turn translates into a domain size of 1-2 nm, in good agreement with the domain sizes predicted from the Raman analysis. Regarding diffusion of functional groups, it should be noted that phase separation is limited by the diffusion of epoxy functional groups due to their higher activation barrier of 0.83 eV compared to 0.30 eV of hydroxyl groups. To confirm the possibility of nanometer scale diffusion of epoxy groups, the diffusion length of the epoxy groups over the period of annealing was estimated. By assuming an Arrhenius expression for the rate of hopping of the epoxy groups, the following diffusivity relation was obtained:

$$D = \frac{1}{4}d^2 k_0 \exp\left(\frac{-E_a}{kT}\right)$$

$$L \sim \sqrt{(Dt)}$$

Using the values of jump length, d=1.23 Å, attempt frequency, $k_0$=26 THz, the computed activation barrier, $E_a$=0.83 eV, and a total time period of 9 days, diffusion lengths on the order of 330 nm at 80° C. and 90 nm at 50° C. were obtained. Although these values are ideal and should be considered as the upper limit of diffusion lengths, these nevertheless justify the fact that the oxygen functional groups have the potential to diffuse considerably to open up graphitic domains on the order of 1-2 nm as estimated from Raman and PL analysis.

6. Stacking of GO Layers

Figure 10:
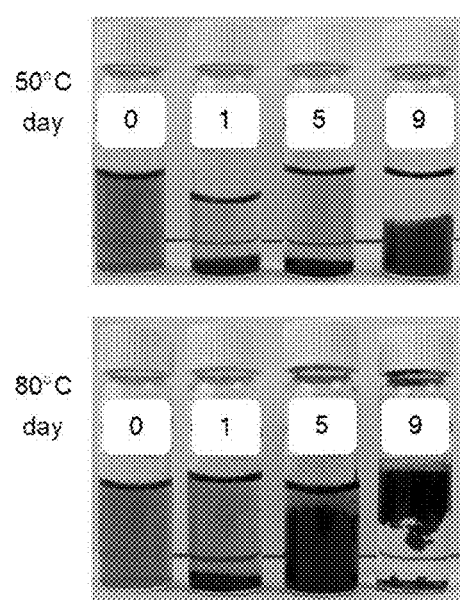
FIG. 10 shows photographs of suspensions comprising graphene oxide species, according to some embodiments.

As shown in FIG. 10, which shows photographs of GO suspensions, increasing stacking and formation of multilayer GO samples was observed, which indicates π-conjugation and increasing graphitization in individual GO layers. Clearly, stacking was more pronounced in the case of samples annealed at 80° C. Settling of GO samples was also observed in the case of fd-GO samples re-dispersed in water. Although GO suspensions are unstable upon annealing and have a tendency to settle down over a time of few hours, they can nevertheless be suspended for longer after being subjected to vigorous vortexing followed by sonication. This procedure was used to characterize GO suspensions.

Figure 11:
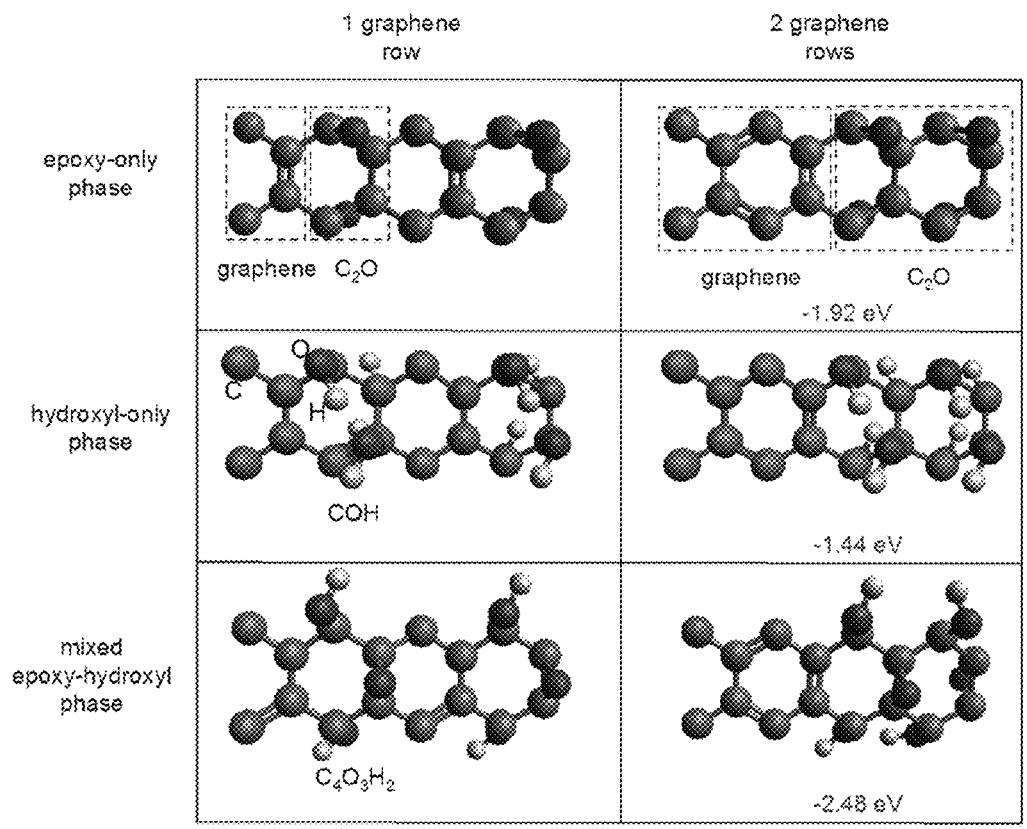
FIG. 11 shows the energetics of the phase separation process, according to some embodiments.

7. Energetics of the Phase Separation Process Considering Ordered and Chemically Homogeneous Oxidized Phases Additional DFT calculations were performed to test the hypothesis of phase separation in GO structures. The calculations in Example 1 were performed on disordered GO structures (where oxidized domains are chemically inhomogeneous and oxygen groups are randomly positioned), which are more realistic. However, here it is shown that phase separation is thermodynamically favorable even when ordered phases of idealized oxidized domains are considered. As shown in FIG. 11, 3 different ordered phases were considered: epoxy-only phase ($C_2O$), hydroxyl-only phase (COH) and a mixed epoxy-hydroxyl phase ($C_4O(OH)_2$). In all three cases, it was observed that phase separation was favorable, i.e. structures with two graphene rows together were more favorable than the structures where they were separated by the oxidized phase. The stability of the phase-separated structure (2 graphene rows) relative to its counterpart on the left (1 graphene row) was also reported.

Another way of looking at FIG. 11 is to note the number of interfaces between oxidized and graphene domains. The structure is more favorable when the number of interfaces is lower (two on the right structure compared to four on the left structure). Although this is a preliminary observation, the impact of interface composition on the stability of GO structures deserves further attention.

8. Estimation of Optical Gaps in Phase Separated GO Structures

Figure 12:
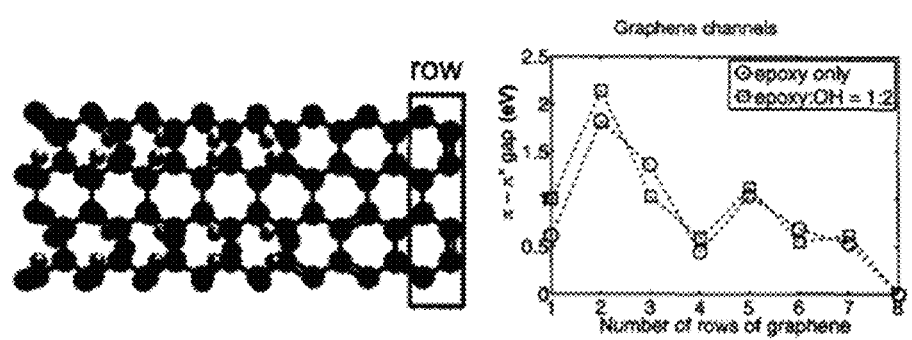
FIG. 12 shows estimation of optical gaps in phase-separated GO structures, according to some embodiments.

To estimate the optical gaps in phase separated GO structures with varying degree of phase separation, GO structures were formed by alternating one-dimensional stripes of laterally confined graphene domains of different widths within oxidized domains, as shown in FIG. 12. The optical absorption spectra of these GO structures were computed within the random phase approximation (RPA) at the DFT level of theory.

These structures represent different levels of confinement of $sp^2$ graphene domains within the $sp^3$ matrix. In addition to the well-known case of confined graphene dots, this result shows that the phase separation process can open up a wide range of optical gaps (~0.5-2.5 eV), which are found to be responsible for the increasing visible absorption and the blue shift in PL observed in annealed GO structures. These results suggest opportunities in patterning alternating graphene/GO stripes and enabling the fine-tuning of the PL peak frequency in the visible, by controlling the size of these domains and oxygen composition of the GO domain.

9. Additional Details on Synthesis of GO

Graphite oxide was synthesized using the Hummer's approach. Briefly, 1 gm of synthetic graphite powder (~325 mesh, 99.9%, Alfa Aesar, MA, USA) was used as the starting material. To this, 0.5 gm of $NaNO_3$ (99%, Alfa Aesar, MA, USA) was added with 23 mL of $H_2SO_4$ (ACS reagent grade, 95-98%, Sigma-Aldrich, MO, USA) in a pre-cooled beaker kept at 0° C. in an ice bath. 3 gm of $KMnO_4$ (99%, Alfa Aesar, MA, USA) was added to the mixture under vigorous stirring using a magnetic stir plate, taking care that the temperature does not rise above 20° C. After the addition was complete, the suspension was removed from the ice bath and heated at 35° C. for 30 min. At the end of the reaction, the paste thickened to a brownish grey color, with reducing gas evolution. Thereafter, 46 mL of deionized water (18.2 MΩ-cm at 25° C., EMD Millipore, Mass., USA) was added, causing an exothermic reaction with violent effervescence and an increase in temperature to ~95° C. The diluted suspension was maintained at 95° C. for 15 min. It was further diluted by adding 70 mL of warm water, and treated with 3% $H_2O_2$ (Sigma-Aldrich, MO, USA) to reduce the unreacted $KMnO_4$ and $MnO_2$ to colorless soluble $MnSO_4$. As soon as peroxide was added, the suspension turned bright yellow. This suspension was filtered using a filter paper (grade 597, 4-7 μm, Whatman, N.J., USA) while still warm, resulting in a yellow-brown filter cake. The filter cake was washed 3 times with a total of 140 mL of warm water to remove unreacted salts. Finally, the graphitic oxide residue cake on the filter paper was resuspended in 320 mL of water, giving a GO suspension of ~0.5 wt. % solids. The suspension was put in a sealed glass bottle and kept in a vacuum desiccator for long-term storage. It was observed that the stock suspension was stable at room temperature, without the addition of any surfactant, and negligible settling of solids was observed over 6 months.

(b) X-Ray Diffraction (XRD) Data of As-Synthesized GO

Figure 17:
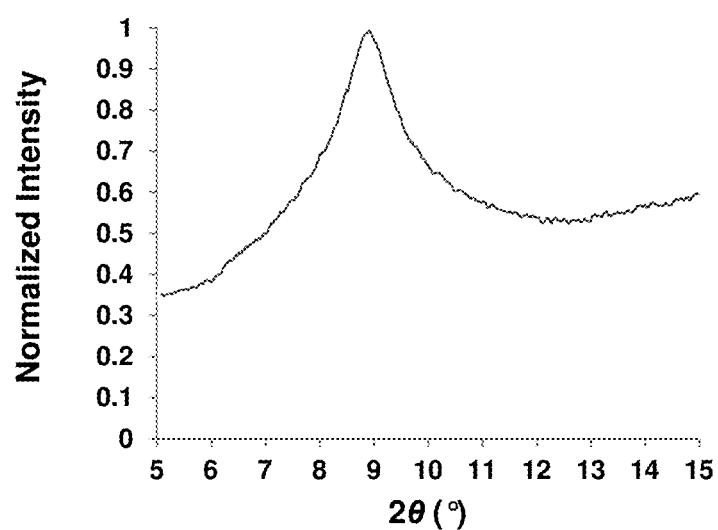
FIG. 17 shows X-ray diffraction (XRD) data for a composition comprising a graphene oxide species, according to some embodiments.

As shown in FIG. 17, using the relation nλ=2d sin(θ), and related parameters: n=1, λ=1.5406 Å and 2θ=8.87837°, the interlayer spacing in our GO samples, d=9.95 Å, was obtained, in agreement with previously reported values on the order of ~9 Å.

Having thus described several aspects of some embodiments of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method, comprising:
   heating a first composition comprising a first graphene oxide species at a temperature of about 150° C. for a period of at least 1 day in the absence of a chemical reagent capable of reacting with the first graphene oxide species, thereby producing a second composition comprising a second graphene oxide species different from the first graphene oxide species, wherein the second graphene oxide species has an atomic % of oxygen of at least about 20 at %.

2. A method as in claim 1, wherein the first graphene oxide species comprises oxygen-containing groups attached to the first graphene oxide species and dispersed over a surface of the first graphene oxide species.

3. A method as in claim 2, wherein the heating step causes at least some of the oxygen-containing groups to rearrange and/or migrate to a different location on the surface of the graphene oxide species.

4. A method as in claim 1, wherein the atomic % of oxygen in the second graphene oxide species is at least about 50% of the atomic % of oxygen in the first graphene oxide species.

5. A method as in claim 1, wherein the second composition comprises:
   a first set of domains comprising carbon atoms substituted with oxygen-containing groups; and
   a second set of domains comprising carbon atoms that are substantially free of oxygen-containing groups.

6. A method as in claim 5, wherein the atomic % of oxygen in the first set of domains is about 40% or greater.

7. A method as in claim 1, wherein the chemical reagent is a reducing agent and/or a strong base.

8. A method as in claim 1, wherein the heating step is performed at a temperature of about 120° C. or less.

9. A method as in claim 1, wherein the heating step is performed for a period of at least about 4 days.

10. A method as in claim 1, wherein the heating step is performed at atmospheric pressure and/or at a pH of about 7.

11. A method as in claim 1, wherein the first and second compositions are in substantially solid form.

12. A method as in claim 1, wherein the first and second compositions further comprise a fluid carrier, wherein the fluid carrier is a non-aqueous solution, an aqueous solution, or water.

13. A method as in claim 1, wherein the atomic % of oxygen in the second graphene oxide species is at least about 25 at %.

14. A method as in claim 2, wherein the oxygen-containing groups comprise epoxy groups, carboxyl groups, carbonyl groups, lactol groups, and/or hydroxyl groups.

15. A method as in claim 1, wherein the second graphene oxide species absorbs at least about 20% more photons in the visible range than the first graphene oxide species, when placed under essentially identical conditions.

16. A method as in claim 1, wherein the second graphene oxide species exhibits a sheet resistance of about $1 \times 10^9$ ohms/sq or less.

17. A method as in claim 1, wherein the first graphene oxide species exhibits a first peak emission wavelength and the second graphene oxide species exhibits a second peak emission wavelength, wherein the second peak emission wavelength is at least about 50 nm less than the first peak emission wavelength.

18. A method as in claim 1, wherein the second graphene oxide species exhibits a peak emission wavelength of about 500 nm or less.

19. A method as in claim 1, wherein the second graphene oxide species has a band gap of about 5 eV or less.

20. A method as in claim 1, wherein the second graphene oxide species is arranged in a device and/or in contact with one or more electrodes.

21. A method as in claim 1, wherein the heating step is performed at a temperature of about 100° C. or less.

22. A method as in claim 1, wherein the heating step is performed at a temperature of about 80° C. or less.

23. A method, comprising:
   heating a first composition comprising a first graphene oxide species at a temperature of about 150° C. or less for a period of at least about 1 day, thereby producing a second composition comprising a second graphene oxide species, wherein the atomic % of oxygen in the second graphene oxide species is at least about 50% of the atomic % of oxygen in the first graphene oxide species.

* * * * *

UNITED STATES PATENT AND TRADEMARK OFFICE
CERTIFICATE OF CORRECTION

| | |
|---|---|
| PATENT NO. | : 9,527,741 B2 |
| APPLICATION NO. | : 14/270276 |
| DATED | : December 27, 2016 |
| INVENTOR(S) | : Priyank Vijaya Kumar et al. |

It is certified that error appears in the above-identified patent and that said Letters Patent is hereby corrected as shown below:

In the Claims

In Claim 3, at Column 32, Lines 23-24, "surface of the graphene oxide species" should read -- surface of the first graphene oxide species --

Signed and Sealed this
Thirtieth Day of January, 2018

Joseph Matal
*Performing the Functions and Duties of the*
*Under Secretary of Commerce for Intellectual Property and*
*Director of the United States Patent and Trademark Office*